(12) United States Patent
Iida et al.

(10) Patent No.: US 9,227,589 B2
(45) Date of Patent: Jan. 5, 2016

(54) SIDE AIRBAG APPARATUS

(71) Applicant: TOYODA GOSEI CO., LTD., Kiyosu-shi, Aichi-ken (JP)

(72) Inventors: Takashi Iida, Kiyosu (JP); Masashi Hotta, Kiyosu (JP); Takuya Hiraiwa, Kiyosu (JP); Yuji Sato, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 0 days.

(21) Appl. No.: 14/605,078

(22) Filed: Jan. 26, 2015

(65) Prior Publication Data

US 2015/0274117 A1    Oct. 1, 2015

(30) Foreign Application Priority Data

Mar. 28, 2014  (JP) ................. 2014-070151

(51) Int. Cl.
*B60R 21/207*  (2006.01)
*B60R 21/233*  (2006.01)
*B60R 21/2338*  (2011.01)
*B60R 21/231*  (2011.01)
*B60R 21/26*  (2011.01)

(52) U.S. Cl.
CPC ......... *B60R 21/23138* (2013.01); *B60R 21/233* (2013.01); *B60R 21/26* (2013.01); *B60R 2021/23146* (2013.01); *B60R 2021/26094* (2013.01)

(58) Field of Classification Search
CPC  B60R 21/23138; B60R 21/261; B60R 21/26; B60R 21/233; B60R 2021/26094; B60R 2021/23146; B60R 2021/23316; B60R 2021/23324; B60R 21/207
See application file for complete search history.

(56) References Cited

U.S. PATENT DOCUMENTS

| 6,478,329 B1 | 11/2002 | Yokoyama |
| 8,684,401 B2* | 4/2014 | Shibayama ........... B60R 21/263 |
| | | 280/730.2 |
| 8,714,584 B2* | 5/2014 | Honda .................. B60R 21/233 |
| | | 280/729 |

(Continued)

FOREIGN PATENT DOCUMENTS

| DE | 60023205 T2 | 7/2006 |
| JP | 2012-25182 A | 2/2012 |

(Continued)

OTHER PUBLICATIONS

DE Office Action issued on Oct. 27, 2015 in the corresponding DE application No. 10 2015 001 052.2.

*Primary Examiner* — Paul N Dickson
*Assistant Examiner* — Laura Freedman
(74) *Attorney, Agent, or Firm* — Posz Law Group, PLC

(57) ABSTRACT

A side airbag apparatus includes an airbag main body. The inside of the airbag main body is divided by a vertical partition including a gas flow restrictor at least into an upstream inflation portion, which is located rearward of the vertical partition and receives inflating gas, and a downstream inflation portion, which is located forward of the vertical partition and receives the inflating gas that has passed through the upstream inflation portion and the gas flow restrictor. The dimension of the vertical partition in the widthwise direction of the automobile seat is set to a dimension that is equal or approximate to the dimension of the airbag main body in the widthwise direction in a case in which the airbag main body is inflated without the vertical partition.

5 Claims, 10 Drawing Sheets

(56) References Cited

U.S. PATENT DOCUMENTS

| | | | | |
|---|---|---|---|---|
| 8,714,588 | B2* | 5/2014 | Honda | B60R 21/20 280/729 |
| 8,720,940 | B2* | 5/2014 | Honda | B60R 21/23138 280/729 |
| 8,740,246 | B2* | 6/2014 | Hotta | B60R 21/239 280/742 |
| 8,757,657 | B1* | 6/2014 | Hotta | B60R 21/233 280/730.2 |
| 8,770,620 | B2* | 7/2014 | Hotta | B60R 21/233 280/730.2 |
| 8,820,785 | B2* | 9/2014 | Shibayama | B60R 21/233 280/729 |
| 8,915,519 | B2* | 12/2014 | Hotta | B60R 21/2346 280/729 |
| 2012/0025499 | A1 | 2/2012 | Shibayama et al. | |
| 2014/0151985 | A1* | 6/2014 | Hotta | B60R 21/2334 280/730.2 |
| 2014/0210192 | A1* | 7/2014 | Hotta | B60R 21/23138 280/730.2 |
| 2015/0021884 | A1* | 1/2015 | Hiraiwa | B60R 21/207 280/728.2 |
| 2015/0021887 | A1* | 1/2015 | Hiraiwa | B60R 21/233 280/729 |

FOREIGN PATENT DOCUMENTS

| | | |
|---|---|---|
| JP | 2012-46050 A | 3/2012 |
| JP | 2013-35535 A | 2/2013 |

* cited by examiner

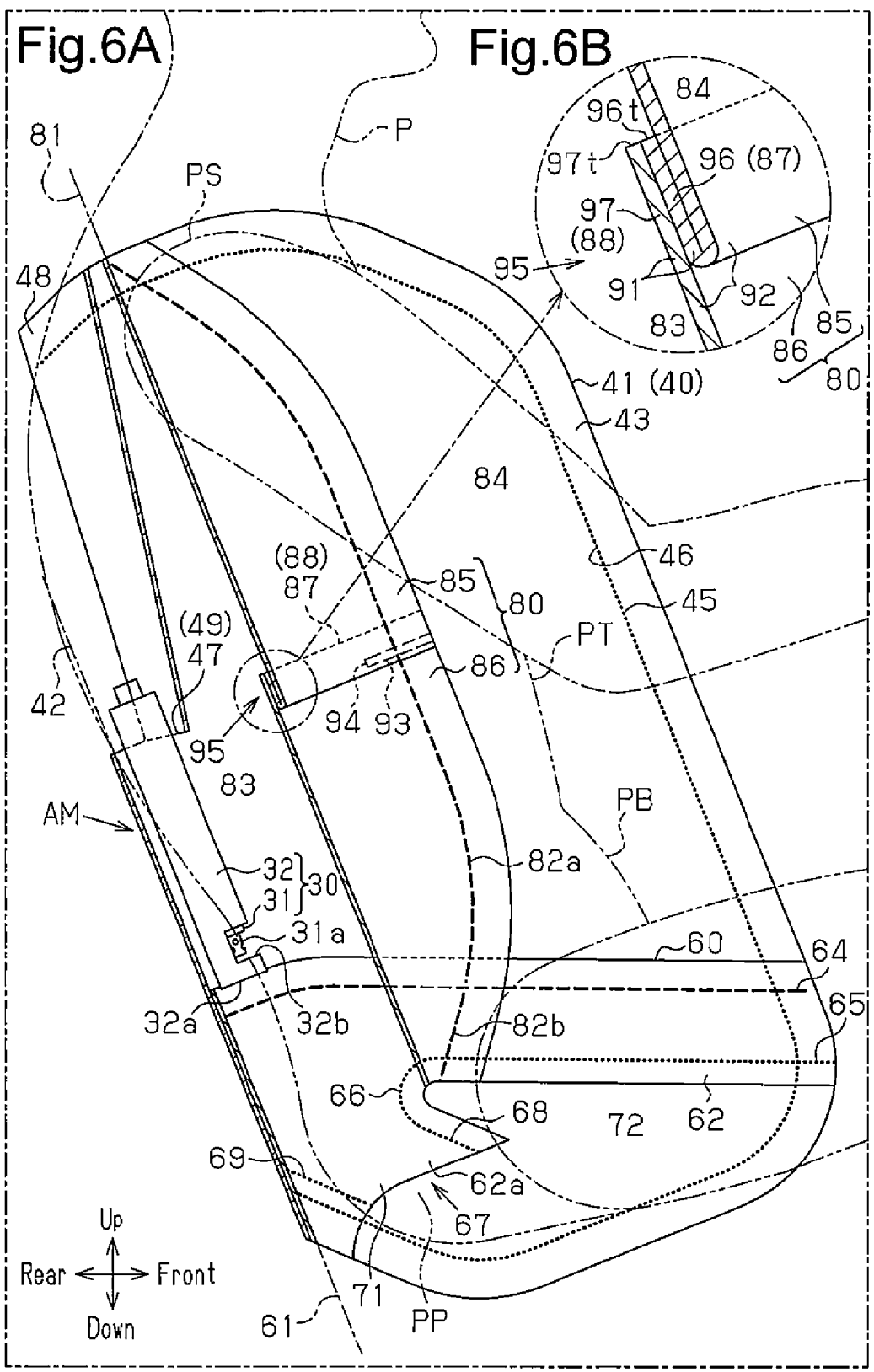

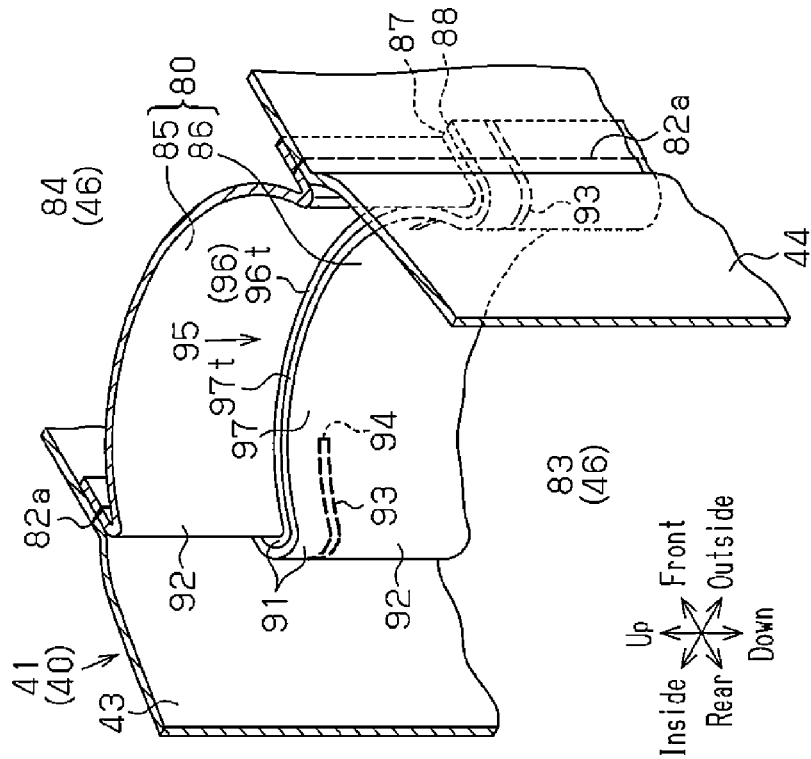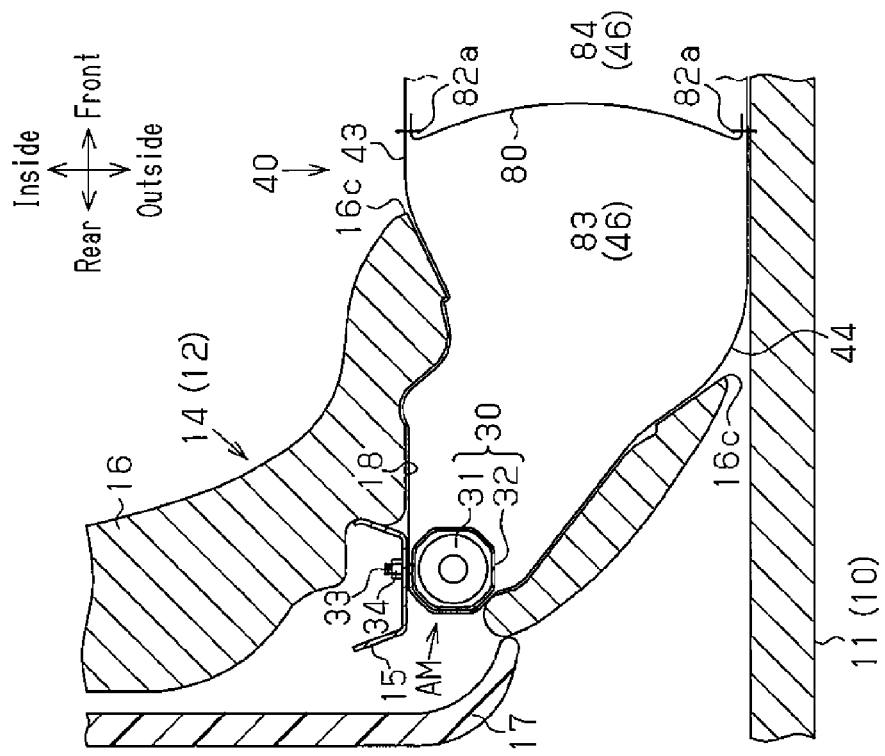

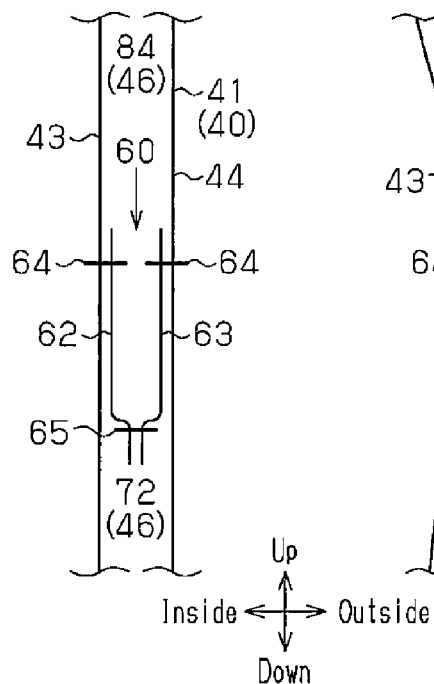
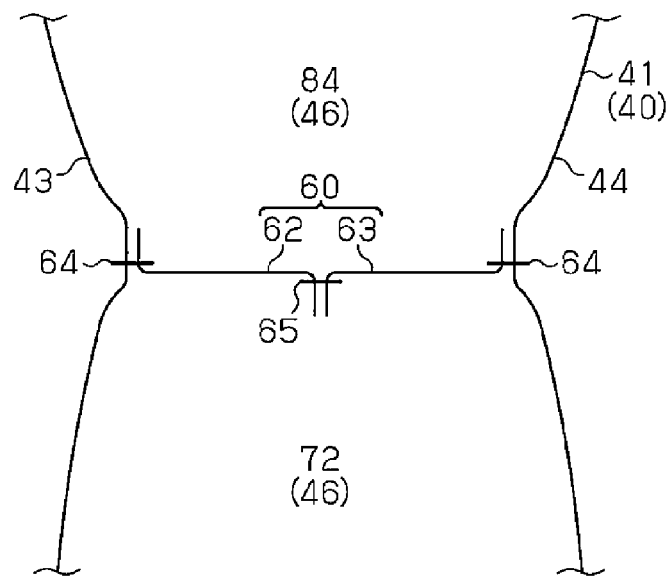
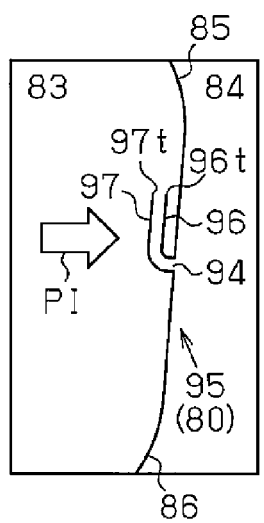
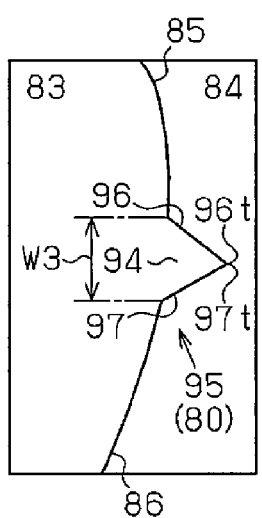
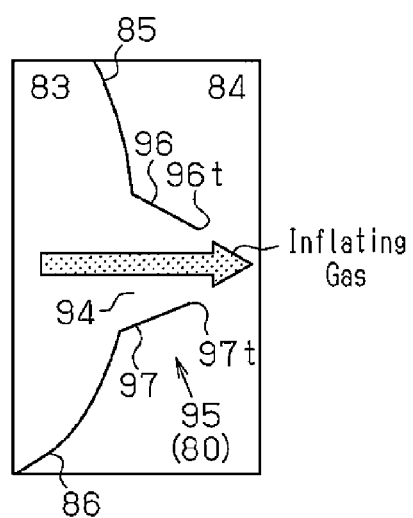

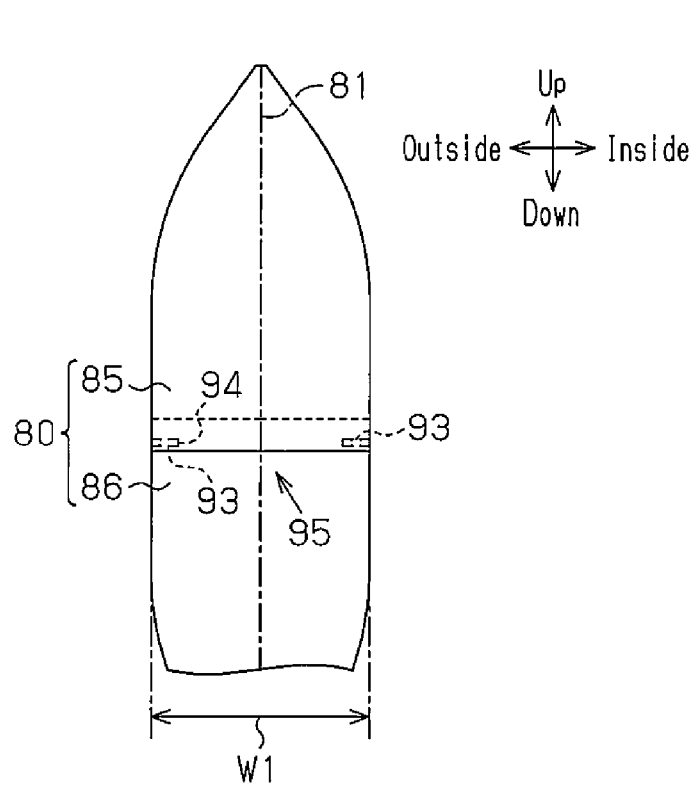
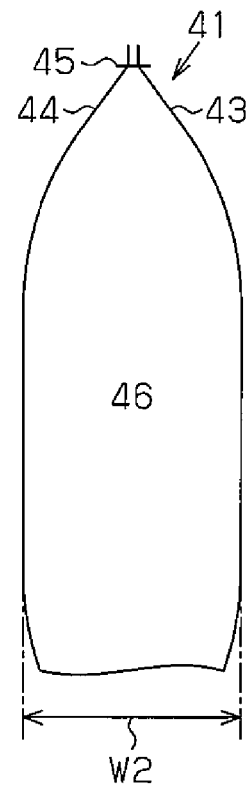
Fig.11A  Fig.11B
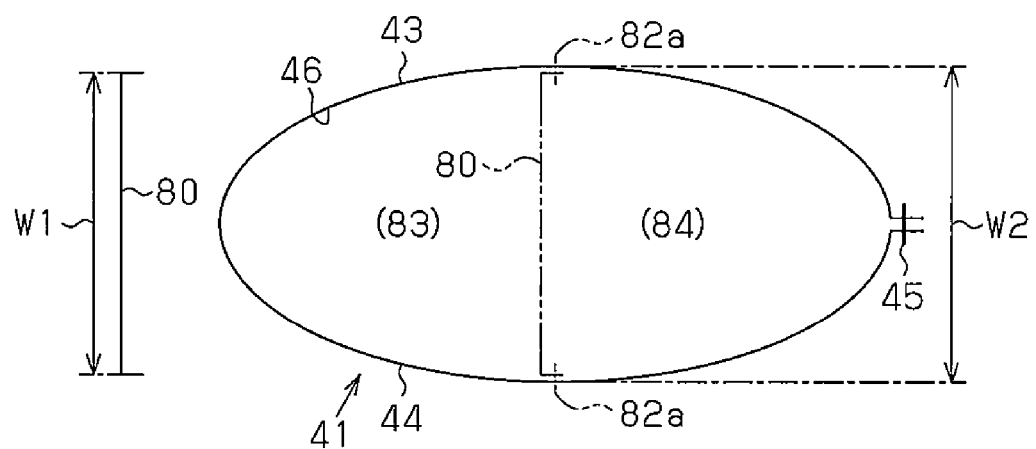
Fig.12A  Fig.12B
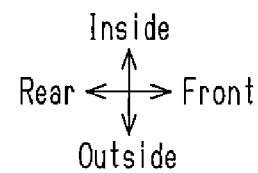

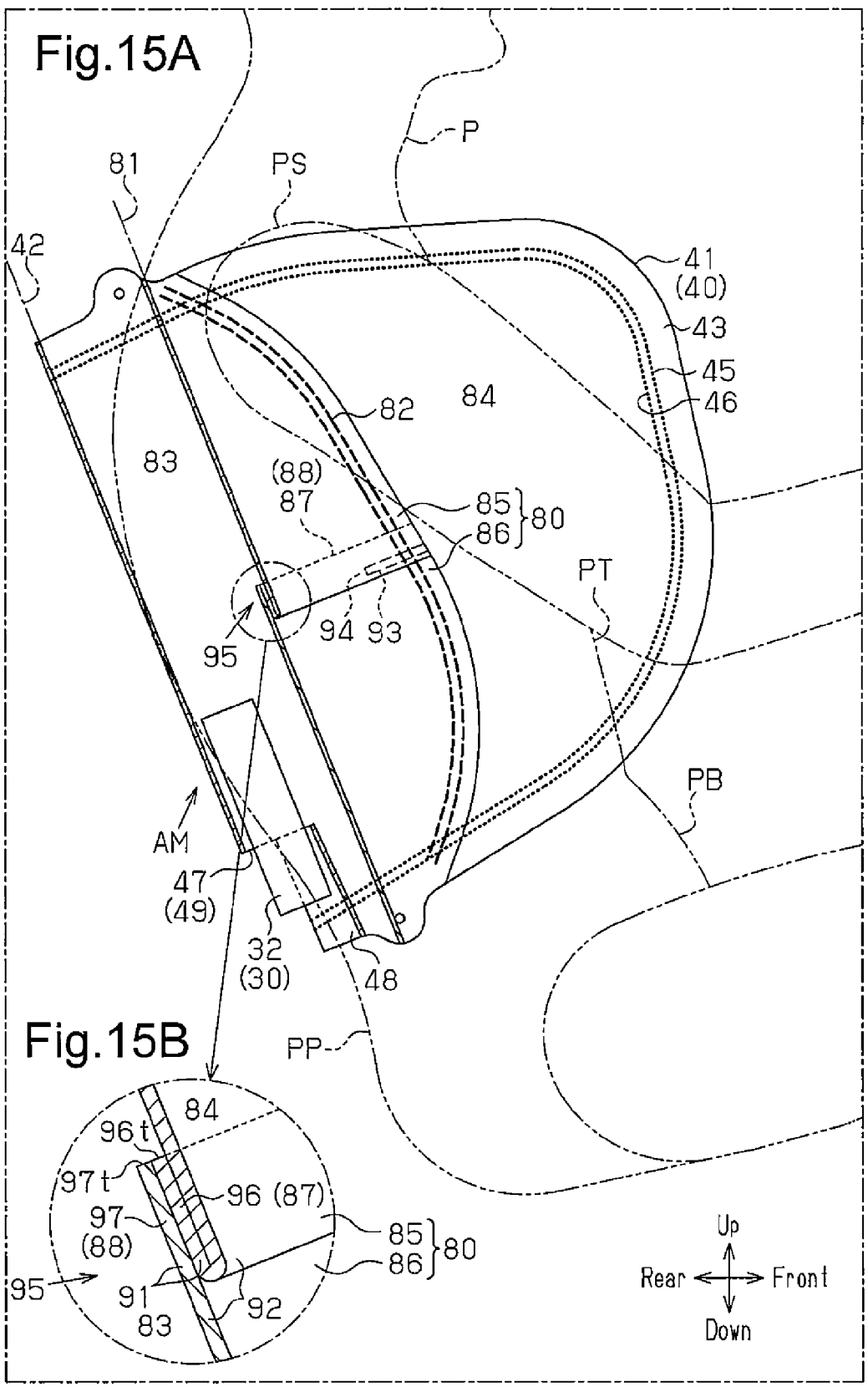

SIDE AIRBAG APPARATUS

BACKGROUND OF THE INVENTION

The present invention relates to a side airbag apparatus that protects an occupant seated in a vehicle seat from an impact by deploying and inflating an airbag main body on a side of the occupant when the impact is applied to a vehicle from a side.

A side airbag apparatus having an airbag and an inflator is effective as an apparatus that protects an occupant seated in an automobile seat when an impact is applied to an automobile from a side, for example, due to a side collision. One form of the side airbag apparatus has been disclosed in, for example, Japanese Laid-Open Patent Publication No. 2013-035535. More specifically, an airbag includes an airbag main body that forms an outer shell and a vertical partition having a gas flow restrictor such as a pressure regulator valve. The vertical partition divides the inside of the airbag main body into an upstream inflation portion and a downstream inflation portion. The upstream inflation portion is located rearward of the vertical partition and receives inflating gas from the inflator. The downstream inflation portion is located forward of the vertical partition and receives the inflating gas that has passed through the upstream inflation portion and the gas flow restrictor.

If a lateral impact is applied to a body side portion, such as a side door, of a vehicle that employs the side airbag apparatus, the inflator supplies inflating gas to the upstream inflation portion to deploy and inflate the upstream inflation portion between an occupant and the body side portion that bulges inward of the vehicle. The inflating gas in the upstream inflation portion flows into the downstream inflation portion through the gas flow restrictor and deploys and inflates the downstream inflation portion. The upstream inflation portion and the downstream inflation portion that are deployed and inflated between the occupant and the body side portion as described above restrain the occupant and reduce a lateral impact transmitted to the occupant via the body side portion.

The downstream inflation portion starts to be deployed and inflated later than the upstream inflation portion. Thus, even if any obstacle is front of the deploying airbag main body, the airbag main body is inhibited from pushing the obstacle hard unlike a case in which the airbag main body has no partition and is deployed and inflated at once.

To restrain and protect the occupant, it is effective to increase the dimension in the vehicle widthwise direction (inflation thickness) when the airbag main body is inflated, or to deploy and inflate the airbag main body in the fore-and-aft direction by a large amount. However, if the airbag main body is deployed and inflated forward by a large amount, the downstream inflation portion that is deployed and inflated in addition to the upstream inflation portion may possibly push the obstacle hard.

The conventional side airbag apparatus of the above Patent Document merely divides the airbag main body and restricts the inflation thickness of the airbag main body with the vertical partition. Thus, the side airbag apparatus is susceptible to improvement through modification of the vertical partition in restraining and protecting an occupant and inhibiting pressure on an obstacle.

SUMMARY OF THE INVENTION

It is an objective of the present invention to provide a side airbag apparatus that has improved performance in restraining and protecting an occupant and inhibiting pressing an obstacle.

To achieve the foregoing objective and in accordance with one aspect of the present invention, a side airbag apparatus is provided that includes an airbag main body, which is deployed and inflated beside an occupant seated in a vehicle seat to restrain the occupant by inflating gas supplied in response to an impact applied from a side of the vehicle seat. The inside of the airbag main body is divided by a vertical partition including a gas flow restrictor at least into an upstream inflation portion, which is located rearward of the vertical partition and receives inflating gas, and a downstream inflation portion, which is located forward of the vertical partition and receives the inflating gas that has passed through the upstream inflation portion and the gas flow restrictor. The dimension of the vertical partition in a widthwise direction of the vehicle seat is set to a dimension that is equal or approximate to the dimension of the airbag main body in the widthwise direction in a case in which the airbag main body is inflated without the vertical partition.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 6A is a partial cross-sectional side view showing the internal structure of the airbag module shown in FIG. 4, together with an occupant;

FIG. 6B is an enlarged partial cross-sectional side view illustrating a part of FIG. 6A;

FIG. 7 is a partial cross-sectional plan view illustrating a state in which the airbag main body of FIG. 3 has been projected from the automobile seat to be deployed and inflated with a part remaining in the seat back;

FIG. 8 is a partial perspective view showing a pressure regulator valve and the surroundings when the vertical partition is tensioned as the upstream inflation portion of the first embodiment is inflated;

FIG. 9A is a partial cross-sectional view taken along line 9a-9a of FIG. 4, schematically showing the internal structure of the airbag lower portion;

FIG. 9B is a partial cross-sectional view showing the internal structure of the airbag lower portion when the lateral partition of FIG. 9A is tensioned;

FIGS. 10A to 10C are cross-sectional side views schematically showing operation of the communication portion and the pressure regulator valve according to the first embodiment;

FIG. 11A is a partial front view illustrating the vertical partition according to the first embodiment;

FIG. 11B is a partial front view illustrating the airbag main body assuming that the airbag main body is inflated without the vertical partition;

FIG. 12A is a schematic cross-sectional plan view illustrating the vertical partition according to the first embodiment;

FIG. 12B is a schematic cross-sectional plan view illustrating the airbag main body assuming that the airbag main body is inflated without the vertical partition;

FIG. 15A is a partial cross-sectional side view showing the internal structure of the airbag module shown in FIG. 13, together with an occupant;

FIG. 15B is an enlarged partial cross-sectional side view illustrating a part of FIG. 15A;

DETAILED DESCRIPTION OF THE PREFERRED EMBODIMENTS

First Embodiment

A first embodiment of the present invention will now be described with reference to FIGS. 1 to 12.

In the following, the direction in which an automobile advances forward will be referred to as the front, and reverse direction will be referred to as the rear. The middle of the widthwise direction of the automobile is used as reference in the widthwise direction of the automobile. A side closer to the middle of the widthwise direction will be referred to as "inner side" of the automobile, while a side farther from the middle of the widthwise direction will be referred to "outer side" of the automobile. An occupant is an average sized adult and is seated in an automobile seat in a predetermined posture (normal posture).

Figure 1:
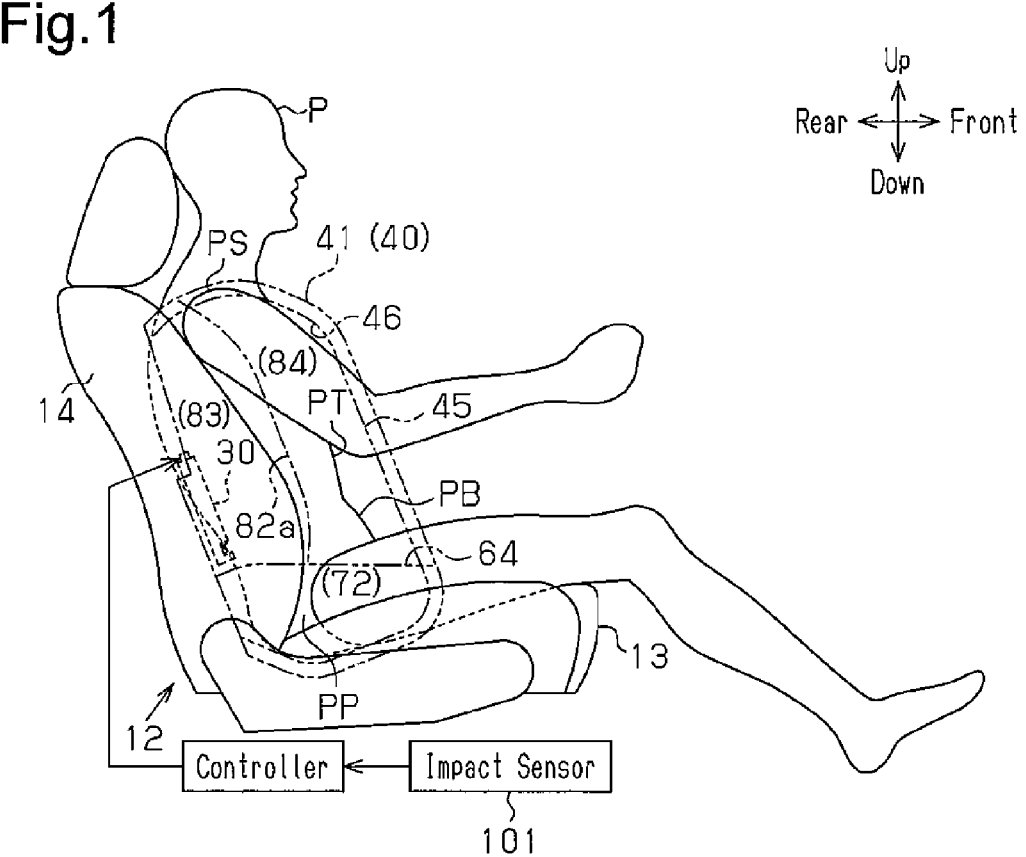
FIG. 1 is a side view illustrating, together with an occupant, an automobile seat to which a side airbag apparatus according to a first embodiment of the present invention is mounted.
Figure 2:
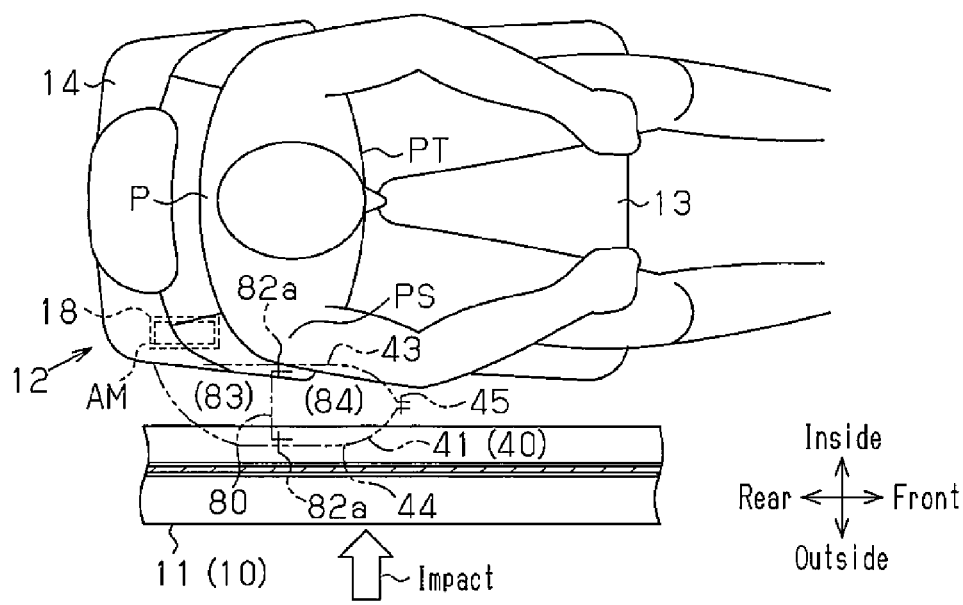
FIG. 2 is a cross-sectional plan view of the positional relationship of the automobile seat, the airbag, the occupant, and a body side portion according to the first embodiment.

As shown in FIGS. 1 and 2, an automobile seat (vehicle seat) 12 is arranged on the inner side of a body side portion 11 of an automobile 10. The body side portion 11 refers to an automobile component that is located at a side of the automobile 10, and mainly corresponds to doors and pillars. For example, part of the body side portion 11 corresponding to the front seat includes a front door and a center pillar (B-pillar). Part of the body side portion 11 corresponding to the rear seat includes a rear part of the side door (rear door), a C-pillar, a front part of the wheel well, and a rear quarter.

The automobile seat 12 includes a seat cushion 13 and a seat back 14. The seat back 14 stands from the rear of the seat cushion 13 and is configured such that the inclination angle of the seat back 14 is adjustable. The automobile seat 12 is arranged in the passenger compartment such that the seat back 14 faces forward. The widthwise direction of the thus arranged automobile seat 12 matches with the direction of the automobile width.

The internal structure of a side portion of the seat back 14 on the outer side will now be described.

Figure 3:
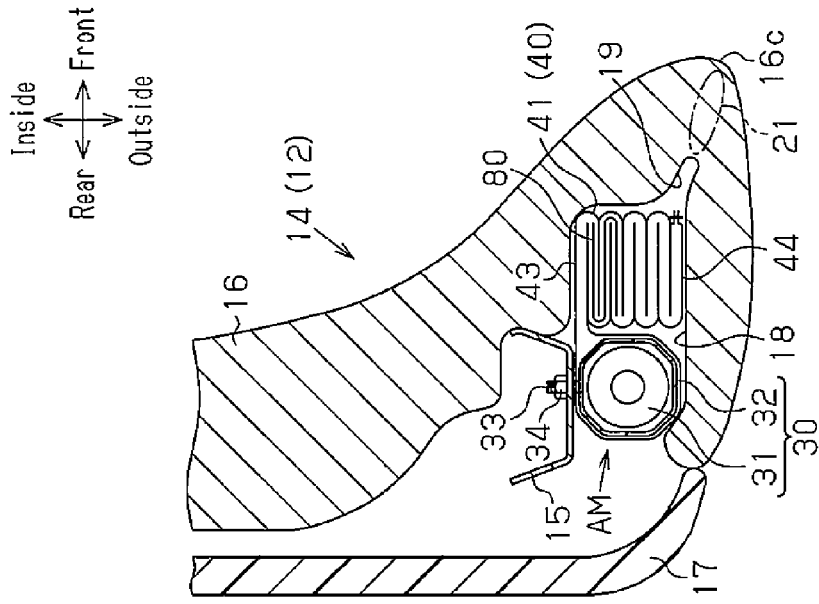
FIG. 3 is a partially cross-sectional plan view showing the internal structure of a side portion of the seat back in which the airbag module of the first embodiment is installed.

A seat frame is incorporated in the seat back 14. As shown in FIG. 3, the seat frame includes a side frame portion 15. The side frame portion 15 is arranged in a part of the seat back 14 that is closer to the outer side and is formed by, for example, bending a metal plate. A seat pad 16 formed of an elastic material such as urethane foam is arranged in front of the seat frame. Also, a hard back board 17, which is formed, for example, of plastic, is arranged on the back of the seat frame. Although the seat pad 16 is coated with a cover, the cover is not illustrated in FIG. 3. The same applies to FIG. 7, which will be discussed below.

In the seat pad 16, a storage portion 18 is provided in the vicinity of the outer side of the side frame portion 15. The storage portion 18 accommodates an airbag module AM, which forms a main part of the side impact airbag apparatus.

A slit 19 is formed to extend from a corner of the storage portion 18. The slit 19 extends diagonally forward and toward the outer side. A part between a front corner 16c of the seat pad 16 and the slit 19 (a part surrounded by a long dashed double-short dashed line in FIG. 3) forms a breakable portion 21, which is designed to be broken by an airbag 40, which will be discussed below.

The airbag module AM includes as its main components a gas generator 30 and the airbag 40. Each of these components will now be described.

<Gas Generator 30>

As shown in FIGS. 3 and 6A, the gas generator 30 includes an inflator 31 and a retainer 32, which surrounds the inflator 31. A pyrotechnic type inflator is employed as the inflator 31. The inflator 31 is substantially columnar and accommodates a gas generating agent (not shown), which generates inflating gas. The inflator 31 has a gas outlet 31a at one end (the lower end). A harness (not shown) for inputting activation signals to the inflator 31 is connected to the other end (the upper end) of the inflator 31.

The inflator 31 may be of a hybrid type instead of the pyrotechnic type, which uses the above gas generating agent. The hybrid type inflator breaks a partition of a compressed gas cylinder filled with compressed gas using explosives and discharges inflating gas.

The retainer 32 functions as a diffuser for controlling the direction of discharged inflating gas and also serves to fasten the inflator 31, together with the airbag 40, to the side frame portion 15. Most of the retainer 32 is formed by bending a plate such as a metal plate into a cylindrical shape. The retainer 32 has an open end 32a at least at the lower end. The retainer 32 has a window 32b at a position in front of the gas outlet 31a. Inflation gas discharged from the gas outlet 31a is delivered to the exterior (downward and forward) of the retainer 32 through the open end 32a and the window 32b.

Multiple bolts 33 are secured to the retainer 32. The bolts 33 function as engaging members for mounting the retainer 32 to the side frame portion 15. The gas generator 30 may be formed by integrating the inflator 31 and the retainer 32.

As shown in FIGS. 1 and 2, the outer shape of the airbag 40 is formed by an airbag main body 41.

<Airbag Main Body 41>

Figure 4:
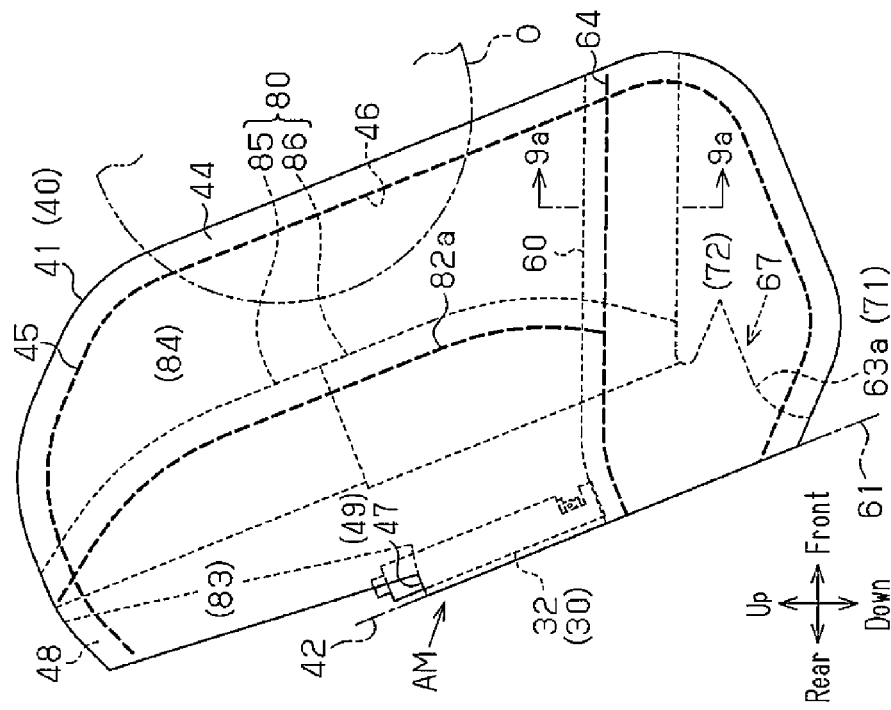
FIG. 4 is a side view illustrating, together with an obstacle, the airbag module in a state where the airbag main body is in an uninflated and deployed state in the first embodiment.
Figure 5:
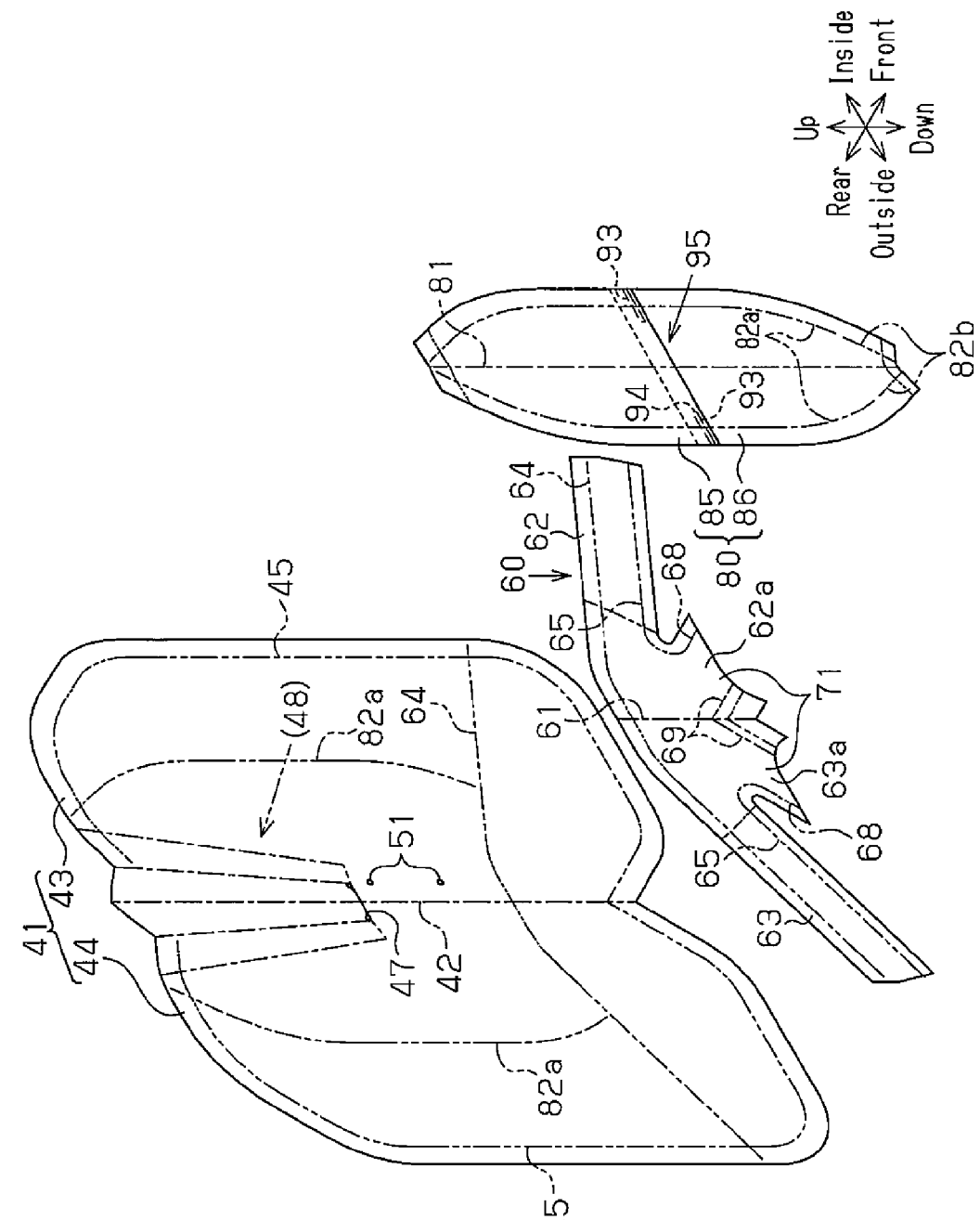
FIG. 5 is an exploded perspective view showing a spread state of the components of the airbag in the first embodiment.

FIG. 4 shows the airbag module AM in the state in which the airbag main body 41 is deployed in a planar form without being filled with inflating gas (hereinafter, referred to as an uninflated and deployed state). FIG. 6A shows the internal structure of the airbag module AM. FIG. 6A shows the airbag module AM, together with an occupant P, in which the airbag main body 41 of FIG. 4 is cut at the center portion in the automobile widthwise direction. FIG. 5 shows the components of the airbag 40 including the airbag main body 41 in a deployed state.

As shown in FIGS. 4 and 5, the airbag main body 41 is formed by folding forward a single fabric piece (also referred to as a base fabric, or a fabric panel) along a folding line 42, which is defined at the center, to be overlapped in the automobile widthwise direction, and joining the overlapped parts to form a bag shape. In this description, to distinguish the two overlapped parts of the airbag main body 41, the part located on the inner side is referred to as a main body fabric portion 43, and the part located on the outer side is referred to as a main body fabric portion 44.

In the first embodiment, the folding line 42 is located at the rear end of the airbag main body 41. However, the folding line 42 may be located on other ends such as the front end, the upper end, and the lower end. The airbag main body 41 may also be formed of two fabric pieces divided along the folding line 42. In this case, the airbag main body 41 is formed by overlapping two fabric pieces in the automobile widthwise direction, and joining the fabric pieces into a bag shape. Furthermore, the airbag main body 41 may be formed of three or more fabric pieces.

As shown in FIGS. 5 and 6A, in the airbag main body 41, the outer shapes of the main body fabric portions 43, 44 are symmetric with respect to the folding line 42. The shape and the size of the fabric portions 43, 44 are set to be able to occupy the region corresponding to most part of the upper body of the occupant P (the section including a shoulder region PS, a thorax region PT, and a lumbar region PP) when the airbag main body 41 is deployed and inflated between the automobile seat 12 and the body side portion 11.

The main body fabric portions 43, 44 are preferably formed of a material having high strength and flexibility to be easily folded. The material may be, for example, woven cloth formed of polyester threads or polyamide threads.

The main body fabric portions 43, 44 are joined at a peripheral joint portion 45 provided at the peripheries of the main body fabric portions 43, 44. In the first embodiment, most of the peripheral joint portion 45 is formed by sewing with sewing threads a part of the peripheries of the main body fabric portions 43, 44 except the rear end (the part in the vicinity of the folding line 42). In this respect, the same applies to side joint portions 64, 65, 93, joint portions 68, 69, and vertical joint portions 82, 82a, 82b, which will be discussed below.

Three types of lines represent sewing portions in FIGS. 4 to 6A and 8. The same applies to FIGS. 13 and 15A, which will be used for describing a second embodiment, and FIG. 17, which will be used for describing a modification. The first type of line includes thick line segments of a certain length arranged intermittently and represents sewing threads as viewed from the side (refer to the peripheral joint portion 45 in FIG. 4). The second type of line includes thin line segments with a certain length (longer than those in a typical broken line) arranged intermittently, and represents the state of sewing threads that are located, for example, behind a fabric piece and cannot be seen directly, or is hidden (refer to a side joint portion 93 in FIG. 6A). The third type of line includes dots arranged at predetermined intervals and represents the cross-section of the sewing threads extending along the cross-section that passes through the sewn portions (refer to the peripheral joint portion 45 in FIG. 6A).

The peripheral joint portion 45 may be formed by method other than sewing using the sewing threads, but may be formed by, for example, using an adhesive. In this respect, the same applies to the side joint portions 64, 65, 93, the joint portions 68, 69, and the vertical joint portions 82, 82a, 82b, which will be discussed below.

In the state shown in FIGS. 4 and 6A, the space between the main body fabric portions 43, 44 surrounded by the peripheral joint portion 45 and the folding line 42 serves as an inflation portion 46 that is deployed and inflated with the inflating gas into a shape longer in the vertical direction than in the automobile widthwise direction.

As shown in FIG. 5, a slit 47 extending in a direction perpendicular to the folding line 42 is formed at the rear end of the folded airbag main body 41 and at the middle in the vertical direction. An inward folding portion 48 is formed at a part of the main body fabric portions 43, 44 upper than the slit 47. The inward folding portion 48 is placed inward of the remaining parts in a folded state. The upper end of the inward folding portion 48 is joined by sewing to the remaining parts of the main body fabric portions 43, 44 via the peripheral joint portion 45. When the inward folding portion 48 is formed, the slit 47 is opened to form an insertion port 49 for the gas generator 30.

As shown in FIG. 5, bolt holes 51 for inserting the bolts 33 of the gas generator 30 are formed at positions (two positions) lower than the slit 47 in the main body fabric portion 43 on the inner side of the automobile.

The inside of the inflation portion 46 is divided into three regions with a lateral partition 60 and a vertical partition 80. The lateral partition 60 and the vertical partition 80 each have the same structure as a member generally referred to as a tether.

<Lateral Partition 60>

As shown in FIGS. 5 and 6A, the lateral partition 60 is formed by folding forward a fabric piece made of the same material as the main body fabric portions 43, 44 along a folding line 61, which is defined at the center, to be overlapped in the automobile widthwise direction. The overlapped portion is then arranged to extend between the lower sections of the main body fabric portions 43, 44. The lateral partition 60 may also be formed of two fabric pieces divided along the folding line 61. To distinguish the two overlapped parts of the lateral partition 60, the part located on the inner side is referred to as a structural fabric portion 62, and the part located on the outer side is referred to as a structural fabric portion 63.

The structural fabric portions 62, 63 include, at the rear portions, extensions 62a, 63a that extend forward and downward. As shown in FIG. 9A, the lateral partition 60, which is folded in half, is located between the main body fabric portions 43, 44 in a state in which the folding line 61 matches with the folding line 42 of the airbag main body 41. The structural fabric portions 62, 63 of the folded lateral partition 60 are joined to the corresponding main body fabric portions 43, 44 with the side joint portions 64 located at the upper peripheral portion. The structural fabric portions 63, 62 are joined to each other by the side joint portion 65 located at the lower peripheral portion. The front ends of the structural fabric portions 62, 63 of the folded lateral partition 60 are joined by sewing to the front ends of the main body fabric portions 43, 44 via the peripheral joint portion 45.

The part of the inflation portion 46 lower than the lateral partition 60 forms an auxiliary inflation portion 72 that is deployed and inflated beside the lumbar region PP of the occupant P.

<Vertical Partition 80>

As shown in FIG. 5, the vertical partition 80 in a deployed state has a vertically long shape. That is, the dimension in the vertical direction is longer than the dimension in the automobile widthwise direction. The dimension of the vertical partition 80 in the automobile widthwise direction is reduced as it separates from the thorax region PT of the occupant P in the vertical direction.

As shown in FIGS. 11A and 12A, the dimension of the deployed vertical partition 80 in the automobile widthwise direction at a predetermined height is referred to as W1. As shown in FIGS. 11B and 12B, in a case in which the airbag main body 41 is inflated assuming that the airbag main body 41 has no vertical partition 80, the dimension of the airbag main body 41 in the automobile widthwise direction at the same height is referred to as W2. In the first embodiment, the dimension W1 of the vertical partition 80 is set to a dimension that is equal or approximate to the dimension W2 of the airbag main body 41.

In FIG. 11A, a margin for a seam (section outer than the vertical joint portions 82a, 82b) is omitted. The same applies to FIG. 14A, which will be discussed below.

As shown in FIGS. 5 and 6A, the vertical partition 80 is folded forward in half along a folding line 81 extending in the vertical direction. The upper end of the vertical partition 80 in this state is joined by sewing to the upper ends of the main body fabric portions 43, 44 with the peripheral joint portion 45. The lower part of the vertical partition 80 is overlaid onto the structural fabric portions 62, 63 of the lateral partition 60. The lower end of the vertical partition 80 is joined by sewing to the structural fabric portions 62, 63 via the above-mentioned side joint portion 65.

Part of the vertical partition 80 that do not overlap the structural fabric portions 62, 63 is joined to the corresponding main body fabric portions 43, 44 with the vertical joint portions 82a. The vertical joint portions 82a extend in the vertical direction along both peripheral portions of the vertical partition 80 in the automobile widthwise direction. Part of the vertical partition 80 that overlaps the structural fabric portions 62, 63 is joined to the corresponding structural fabric portions 62, 63 with the vertical joint portions 82b. The vertical joint portions 82b are located close to the lower section of the joint portions 82a and extend in the vertical direction along both peripheral portions of the vertical partition 80 in the automobile widthwise direction. The vertical partition 80 is located between the main body fabric portions 43, 44 by the above-described joining operation and extends at the center of the inflation portion 46 in the fore-and-aft direction.

Part of the inflation portion 46 upper than the lateral partition 60 and rearward of the vertical partition 80 forms an upstream inflation portion 83, which is deployed and inflated beside the shoulder region PS of the occupant P and beside the rear half of the thorax region PT. The part of the inflation portion 46 forward of the vertical partition 80 forms a downstream inflation portion 84, which is deployed and inflated beside the front half of the thorax region PT.

The vertical partition 80 includes two fabric pieces 85, 86. The fabric pieces 85, 86 are formed of the same material as the main body fabric portions 43, 44 and are arranged one above the other in the vertical direction.

As shown in FIGS. 6A, 6B, and 8, a lower end 87 of the fabric piece 85 is overlaid onto an upper end 88 of the fabric piece 86. The fabric pieces 85, 86 are joined to each other at the side joint portions 93, which extend in the automobile widthwise direction at the boundary between a band-like overlapping portions 91 and the remaining parts (hereinafter, referred to as non-overlapping portions 92).

At least one of the fabric pieces 85, 86 may be divided into two along the folding line 81.

Most of the gas generator 30 is arranged to extend substantially in the vertical direction when accommodated in the rear end portion of the upstream inflation portion 83. The upper portion of the gas generator 30 extends through the insertion port 49 to be exposed to the outside of the airbag main body 41. The bolts 33 of the gas generator 30 are inserted in the corresponding bolt holes 51. The insertion of the bolts 33 engages the gas generator 30 to the airbag main body 41 in a state where the position is determined with respect the airbag main body 41. In this state, the gas outlet 31a is located near the auxiliary inflation portion 72.

The lateral partition 60 is provided with a communication portion 66 and a check valve 67 as an auxiliary gas flow restrictor. The vertical partition 80 is provided with a communication portion 94 and a pressure regulator valve 95 as the gas flow restrictor.

<Communication Portion 66 and Check Valve 67>

As shown in FIGS. 5 and 6A, the communication portion 66 connects the upstream inflation portion 83 to the auxiliary inflation portion 72. The side joint portions 65 of the lateral partition 60, which is folded in half, are not joined to each other at the rear ends of the structural fabric portions 62, 63. In other words, the side joint portions 65, which join the structural fabric portions 62, 63 to each other, are absent in an area including the folding line 61. In this manner, the communication portion 66 is formed by a disjoined part where the side joint portions 65 are not provided.

The check valve 67 regulates the flow of inflating gas through the communication portion 66. That is, the check valve 67 allows inflating gas to flow from the upstream inflation portion 83 to the auxiliary inflation portion 72, but restricts the flow in the opposite direction.

Front peripheries of the extensions 62a, 63a of the lateral partition 60, which is folded in half, are joined to each other with the joint portions 68 formed along the peripheries. The joint portions 68 are inclined to be lower in the front, and the rear ends of the joint portions 68 are connected to the rear ends of the side joint portions 65.

The rear ends of the extensions 62a, 63a of the lateral partition 60, which is folded in half, are joined to each other with the joint portions 69, which extend forward and downward from the communication portion 66 in an inclined manner. Parts of the extensions 62a, 63a rearward of the joint portions 69 are joined by sewing to the rear lower ends of the main body fabric portions 43, 44 via the above-mentioned peripheral joint portions 45.

Parts of the extensions 62a, 63a that are surrounded by the communication portion 66 and the joint portions 68, 69 form valve bodies 71 of the check valve 67. The check valve 67 allows flow of inflating gas when one of the valve bodies 71 is separated from the other. This state of the check valve 67 is referred to as a valve opening state. The check valve 67 restricts flow of inflating gas when the valve bodies 71 contact each other in at least parts thereof. This state of the check valve 67 is referred to as a valve closing state. The check valve 67 may be formed by a member separate from the lateral partition 60.

<Communication Portion 94 and Pressure Regulator Valve 95>

The communication portion 94 and the pressure regulator valve 95 are controlled based on whether a condition is satisfied that an external force is applied upon restraint of an occupant by the upstream inflation portion 83. Specifically, the communication portion 94 and the pressure regulator valve 95 are substantially closed until the condition is satisfied and are opened when the condition is satisfied. As shown in FIGS. 6A and 8, the communication portion 94 and the pressure regulator valve 95 are located at substantially the center of the vertical partition 80 in the automobile widthwise direction when the vertical partition 80 is tensioned in response to inflation of the upstream inflation portion 83. More specifically, the side joint portions 93 of the vertical partition 80 are disjoined at substantially the center in the automobile widthwise direction. The portion where the side joint portions 93 are disjoined extends in the automobile widthwise direction and forms the slit-like communication portion 94, which connects the upstream inflation portion 83 to the downstream inflation portion 84.

The pressure regulator valve 95 regulates the flow of inflating gas in the communication portion 94 to control the internal pressure of the upstream inflation portion 83 and the downstream inflation portion 84. Part of the end 87 of the fabric piece 85 corresponding to the communication portion 94 in the automobile widthwise direction forms a valve body 96 of the pressure regulator valve 95, and part of the end 88 of the fabric piece 86 corresponding to the communication portion 94 in the automobile widthwise direction forms a valve body 97 of the pressure regulator valve 95.

As shown in FIGS. 10A and 10B, when the valve bodies 96, 97 contact each other at least partially, for example, at distal ends 96t, 97t, the flow of the inflating gas through a space between the valve bodies 96, 96 is restricted. This state of the pressure regulator valve 95 is referred to as a valve closing state. When the communication portion 94 is opened, and the entire valve body 96 separates from the entire valve body 97 as shown in FIG. 10C, the flow of inflating gas through the space between the valve bodies 96, 97 is permitted. This state of the pressure regulator valve 95 is referred to as a valve opening state.

The overlapping portions 91 are folded upward at the boundary between the overlapping portions 91 and the non-overlapping portions 92 and are overlaid onto the upper non-overlapping portion 92. However, the overlapping portions 91 may be folded downward and overlaid onto the lower non-overlapping portion 92. The ends of the folded band-like overlapping portions 91 in the automobile widthwise direction are joined by sewing to the corresponding main body fabric portions 43, 44 of the airbag main body 41 and the non-overlapping portion 92 via the above-mentioned vertical joint portions 82a.

The airbag module AM is made compact as shown in FIG. 3 (hereinafter, referred to as a storage form) by folding the airbag main body 41 in the uninflated and deployed state (see FIG. 6A). The airbag module AM is folded in this manner to be suitably accommodated in the storage portion 18, which has a limited size in the seat back 14.

In the above-mentioned airbag module AM, the bolts 33, which extend from the gas generator 30 and are inserted in the bolt holes 51 of the main body fabric portion 43, are inserted in the side frame portion 15. Nuts 34 are fastened to the bolts 33 in this state. The fastening secures the gas generator 30 to the side frame portion 15 together with the airbag main body 41.

The gas generator 30 may be attached to the side frame portion 15 using members other than the bolts 33 and the nuts 34. The inflator 31 may be directly attached to the side frame portion 15 without using the retainer 32.

As shown in FIG. 1, the side airbag apparatus includes an impact sensor 101 and a controller 102 in addition to the above described airbag module AM. The impact sensor 101 includes an acceleration sensor and is mounted on the body side portion 11 of the automobile 10 to detect the impact applied to the body side portion 11 from the outer side. The controller 102 controls the operation of the inflator 31 based on a detection signal from the impact sensor 101.

A seat belt apparatus for restraining the occupant P seated on the automobile seat 12 is installed in the passenger compartment. Illustration of the seat belt apparatus is omitted in FIGS. 1 and 2.

The side airbag apparatus of the first embodiment is constructed as described above. The typical operation mode will now be described as operation of the side airbag apparatus.

FIGS. 10A to 10C schematically show the forms of the pressure regulator valve 95 and the vertical partition 80 being changed over time after the inflating gas starts to be supplied, and detailed parts are omitted or simplified.

According to this side airbag apparatus, when the impact sensor 101 does not detect any impact from the side of the body side portion 11, the controller 102 does not output an activation signal to the inflator 31 to activate the inflator 31. Thus, the inflating gas is not discharged. The airbag main body 41 keeps being accommodated in the storage portion 18 in the storage form.

When the impact sensor 101 detects that an impact of a magnitude greater than or equal to a predetermined value has been applied to the body side portion 11 due to, for example, a side collision while the automobile 10 is running, the controller 102 sends, based on the detection signal, an activation signal to the inflator 31 to activate the inflator 31. In response to the activation signal, the inflator 31 discharges inflating gas through the gas outlet 31a. When some of the inflating gas is supplied to the upstream inflation portion 83 of the airbag main body 41 that is in the storage form, the internal pressure of the upstream inflation portion 83 is increased so that the upstream inflation portion 83 acts to deploy and inflate to have curved surfaces. At this time, the vertical partition 80, which defines the front portion of the upstream inflation portion 83, forms a curved surface bulging forward as shown in FIG. 8.

The remaining of the inflating gas discharged from the gas generator 30 flows through the upstream inflation portion 83 toward the check valve 67. During the period in which inflating gas is being supplied to the check valve 67, a force that deforms the valve bodies 71 into a tubular shape is generated. Thus, the inflating gas passes between the communication portion 66 and the valve bodies 71 and flows into the auxiliary inflation portion 72. The auxiliary inflation portion 72 starts to inflate, and the lateral partition 60 is pulled toward the opposite sides in the automobile widthwise direction by parts of the main body fabric portions 43, 44 forming the upstream inflation portion 83 and the auxiliary inflation portion 72. The continuous supply of the inflating gas from the inflator 31 increases the internal pressure of the auxiliary inflation portion 72.

As shown in FIG. 10A, an internal pressure PI is applied to the valve bodies 96, 97 of the pressure regulator valve 95 in the overlapping direction (the thickness direction). The internal pressure PI is not as high as the internal pressure when the upstream inflation portion 83 restrains the occupant P or the internal pressure of the auxiliary inflation portion 72. The valve bodies 96, 97 are brought into close contact in the entire surfaces with each other by the internal pressure PI, and are in a self-sealing state, which restricts the flow of the inflating gas through between the valve bodies 96, 97. Furthermore, the overlapping portions 91, which have been folded and overlaid onto the upper non-overlapping portion 92, are pressed against the non-overlapping portion 92 by the internal pressure (see FIG. 8). This allows the valve bodies 96, 97 to be further easily closed.

The dimension of the vertical partition 80 in the vertical direction is longer than that in the automobile widthwise direction (see FIG. 5). Thus, the tension in the automobile widthwise direction applied to the vertical partition 80 is likely to be stronger than the tension in the vertical direction. Since the communication portion 94 extends in the automobile widthwise direction in which strong tension is likely to be applied, the communication portion 94 is easily closed.

Further, when the upstream inflation portion 83 is deployed and inflated, strong tension in the automobile widthwise direction is applied not only to the non-overlapping portion 92 of the vertical partition 80, but also to the overlapping portions 91. This is because the ends in the automobile widthwise direction of the overlapping portions 91 are joined to the main body fabric portions 43, 44.

When the valve bodies 96, 97 at least partially contact each other, the pressure regulator valve 95 is substantially closed. The inflating gas in the upstream inflation portion 83 is restricted from flowing between the valve bodies 96, 97 and via the communication portion 94 into the downstream inflation portion 84. The restriction causes the inflating gas to be accumulated in the upstream inflation portion 83, so that the internal pressure of the upstream inflation portion 83 is mainly increased.

At this time, the inflation portion 46 is yet to contact the occupant P.

The increase in the internal pressure causes the upstream inflation portion 83 and the auxiliary inflation portion 72 to be unfolded (deployed) and inflated. Then, the seat pad 16 of the seat back 14 is pushed by the upstream inflation portion 83 and the auxiliary inflation portion 72 and breaks at the breakable portion 21 (see FIG. 3). As shown in FIG. 7, the upstream inflation portion 83 and the auxiliary inflation portion 72 project forward from the seat back 14 through the broken portion with a part thereof remaining in the storage portion 18.

Subsequently, the auxiliary inflation portion 72 to which the inflating gas is supplied is deployed and inflated beside the lumbar region PP, and the upstream inflation portion 83 is deployed and inflated beside the shoulder region PS and beside the rear half of the thorax region PT. At this time, the downstream inflation portion 84 is yet to be inflated or only slightly inflated with a low internal pressure.

As shown in FIG. 9B, the lateral partition 60 is tensioned by being pulled in the automobile widthwise direction. The lateral partition 60 in the tensioned state restricts the dimension of the auxiliary inflation portion 72 in the automobile widthwise direction and also restricts the dimension of the upstream inflation portion 83 in the automobile widthwise direction at the boundary between the vertical partition 80 and the lateral partition 60.

As the body side portion 11 bulges further inward of the automobile, the upstream inflation portion 83 and the auxiliary inflation portion 72 push the shoulder region PS, the rear half of the thorax region PT, and the lumbar region PP inward to move the occupant P inward, restrain the occupant P, and protect the occupant P from the impact. Such inward movement increases the distance between the occupant P and the body side portion 11 and increases the space for deploying and inflating the downstream inflation portion 84.

In the state in which the valve bodies 96, 97 are in close contact with each other with the entire surfaces (substantially closed), external force is applied from the body side portion 11 while the inflating gas keeps being supplied to the upstream inflation portion 83. This causes the pressure regulator valve 95 to start to open.

That is, the upstream inflation portion 83 starts being deformed by external force that accompanies the restraint of the occupant P in the middle of the supplying period of inflating gas to the upstream inflation portion 83. Accordingly, the strong tension applied to the vertical partition 80 in the automobile widthwise direction is reduced.

The internal pressure PI of the upstream inflation portion 83 is further increased in accordance with the deformation of the upstream inflation portion 83, and the vertical partition 80 is pushed toward the downstream inflation portion 84 (see FIG. 10B). Thus, the tension applied to the vertical partition 80 is changed. As the tension is changed, the difference between the tension acting in the automobile widthwise direction and the tension acting in the vertical direction is reduced. Then, the communication portion 94 in the vertical partition 80 is permitted to be deformed, and the valve bodies 96, 97 of the vertical partition 80 are permitted to operate.

The overlapping portions 91 are overlapped with the non-overlapping portion 92, and are joined to the main body fabric portions 43, 44 by the vertical joint portions 82a at the ends in the automobile widthwise direction. Therefore, the force that acts to maintain the overlapped state is strong at the parts of the overlapping portions 91 close to the vertical joint portions 82a. However, the force is reduced as the distance from the vertical joint portions 82a is increased, and the force is minimized at the center in the automobile widthwise direction, that is, on the communication portion 94 and the valve bodies 96, 97. Thus, the overlapping portions 91, which are pulled in the vertical direction, are deformed in the vertical direction at the communication portion 94, the valve bodies 96, 97, and in the vicinity thereof.

When the communication portion 94 is opened in the vertical direction by a certain amount, only the valve bodies 96, 97, which have received high internal pressure PI of the upstream inflation portion 83, are pushed out (reversed) into the downstream inflation portion 84 via the communication portion 94. When the width W3 of the communication portion 94 in the vertical direction is narrow, the distal ends 96t, 97t of the valve bodies 96, 97 contact each other to keep closing the pressure regulator valve 95.

When the width W3 of the communication portion 94 is increased, which separates the distal ends 96t, 97t from each other as shown in FIG. 10C to open the pressure regulator valve 95, the flow restriction is removed. The inflating gas in the upstream inflation portion 83 is permitted to flow out to the downstream inflation portion 84 passing through the communication portion 94 and the valve bodies 96, 97 in order.

As the inflating gas flows out, the internal pressure of the upstream inflation portion 83 turns from increasing to decreasing. However, the body side portion 11 still continues to bulge inward of the automobile, and the inflation portion 46 is pushed against the occupant P at the upstream inflation portion 83.

As the inflating gas flows in, the downstream inflation portion 84 starts to inflate, and the internal pressure of the downstream inflation portion 84 starts to increase. The downstream inflation portion 84 is unfolded (deployed), and acts to inflate to have curved surfaces together with the upstream inflation portion 83. The vertical partition 80 is pulled toward the opposite sides in in the automobile widthwise direction by the downstream inflation portion 84 as shown in FIG. 2.

At this time, the downstream inflation portion 84 is deployed and inflated beside the front half of the thorax region PT with an internal pressure lower than that of the upstream inflation portion 83. In this state, the upstream inflation portion 83 and the auxiliary inflation portion 72 have increased the space between the body side portion 11 and the upper body of the occupant P to provide the space for deploying and inflating the downstream inflation portion 84. Therefore, compared to a case in which such an increase in the space does not take place, the downstream inflation portion 84 can be easily deployed and inflated forward.

Slightly after the start of increase in the internal pressure of the downstream inflation portion 84, the body side portion 11, which is bulging inward, starts pressing the downstream inflation portion 84 against the upper body of the occupant P in addition to the upstream inflation portion 83. The upper body starts to be restrained by the downstream inflation portion 84 in addition to the upstream inflation portion 83.

Since the above-mentioned auxiliary inflation portion 72 extends along the upstream inflation portion 83 and the downstream inflation portion 84, the auxiliary inflation portion 72 is deployed and inflated not only below the upstream inflation portion 83 but also below the downstream inflation portion 84. Thus, the auxiliary inflation portion 72 is deployed and inflated forward in a wide range as compared to a case in which the auxiliary inflation portion 72 is deployed and inflated only below the upstream inflation portion 83.

The airbag main body 41, in which the upstream and downstream inflation portions 83, 84 and the auxiliary inflation portion 72 are each deployed and inflated, is located between the upper body of the occupant P and the inwardly bulging body side portion 11. The airbag main body 41 pushes the upper body inward of the automobile and restrains the upper body. The side impact transmitted to the upper body through the body side portion 11 is reduced by the airbag main body 41, and the upper body is protected. In particular, a range of the lumbar region PP that is large in the front-rear direction is restrained and protected by the auxiliary inflation portion 72, which is deployed and inflated below both the upstream inflation portion 83 and the downstream inflation portion 84.

Since the downstream inflation portion 84 starts being deployed and inflated later than the upstream inflation portion 83, even if an obstacle O is in front of the airbag main body 41 before its inflation as shown by the long dashed double-short dashed line in FIG. 4, the obstacle O is unlikely to be pushed hard by the airbag main body 41. In this respect, the first embodiment greatly differs from the case in which the airbag main body 41 without the vertical partition 80 is deployed and inflated at once and the obstacle O may possibly be pushed hard.

If the dimension W1 of the vertical partition 80 in the automobile widthwise direction is smaller than the dimension W2 of the airbag main body 41 in the automobile widthwise direction in a case in which the airbag main body 41 without the vertical partition 80 is inflated, the vertical partition 80 pulled by the downstream inflation portion 84 deforms from a curved surface that bulges forward to a flat surface tensioned in the automobile widthwise direction. The vertical partition 80 restricts the dimension of the airbag main body 41 in the automobile widthwise direction. The restriction hinders the performance of the airbag main body 41 in restraining and protecting the occupant P. The restriction of the dimension in the automobile widthwise direction increases the dimension of the airbag main body 41 in the fore-and-aft direction. Thus, the front end of the inflated downstream inflation portion 84 is located further forward. If any obstacle O is located ahead before the airbag main body 41 is inflated, the obstacle O may possibly be pushed hard by the downstream inflation portion 84.

In the first embodiment, which employs the vertical partition 80 having the dimension W1 in the automobile widthwise direction that is equal or approximate to the dimension W2 of the airbag main body 41 in the automobile widthwise direction, the vertical partition 80, when pulled by the downstream inflation portion 84, deforms from the curved surface bulging forward to the flat surface in the automobile widthwise direction in the manner similar to the above. However, the airbag main body 41 bulges in the automobile widthwise direction to a dimension that is equal or approximate to the dimension in a case in which the airbag main body 41 without the vertical partition 80 is inflated. The dimension in the automobile widthwise direction when the airbag main body 41 is inflated is unlikely to be restricted by the vertical partition 80. Thus, the airbag main body 41 is inflated in the automobile widthwise direction to the maximum dimension available and restrains and protects the occupant P.

Since the dimension in the automobile widthwise direction is unlikely to be restricted as described above, the front end of the inflated downstream inflation portion 84 is located rearward of that in a case in which the dimension is restricted. Thus, if any obstacle O is located ahead before the airbag main body 41 is inflated, the obstacle O is unlikely to be pushed hard by the downstream inflation portion 84.

Furthermore, in the first embodiment, in which the vertical partition 80 is joined to the center of the airbag main body 41 in the fore-and-aft direction with the vertical joint portions 82a, the front end of the upstream inflation portion 83 is located rearward as compared to a case in which the vertical partition 80 is joined at a position that is forward of the center. As a result, if any obstacle O is located ahead before the airbag main body 41 is inflated, the obstacle O is more unlikely to be pushed hard by the upstream inflation portion 83.

When the discharge of inflating gas from the inflator 31 stops and the inflating gas in the auxiliary inflation portion 72 acts to flow to the upstream inflation portion 83, the valve bodies 71 of the check valve 67 are pushed by the high pressure in the auxiliary inflation portion 72 and contact each other. The check valve 67 is thus closed and prevents the inflating gas in the auxiliary inflation portion 72 from flowing out (reverse flow) to the upstream inflation portion 83 through the space between the valve bodies 71 and the communication portion 66. Therefore, the internal pressure of the auxiliary inflation portion 72, which has been increased to a level adequate for protecting the lumbar region PP of the occupant P, is prevented from being reduced by the reverse flow.

The first embodiment as described above has the following advantages.

(1) The dimension W1 of the deployed vertical partition 80 in the automobile widthwise direction is set to a dimension that is equal or approximate to the dimension W2 of the airbag main body 41 in the automobile widthwise direction in a case in which the airbag main body 41 without the vertical partition 80 is inflated (FIGS. 12A and 12B).

Thus, the dimension of the inflated airbag main body 41 in the automobile widthwise direction is prevented from being restricted by the vertical partition 80, and the airbag main body 41 is permitted to inflate in the automobile widthwise direction to the maximum dimension available. Thus, the occupant P is favorably restrained and protected.

As compared to a case in which the dimension of the inflated airbag main body 41 in the automobile widthwise direction is restricted by the vertical partition 80, the front end of the inflated downstream inflation portion 84 is located rearward. As a result, if any obstacle O is located ahead before the airbag main body 41 is inflated, the obstacle O is prevented from being pushed hard by the downstream inflation portion 84.

(2) The vertical partition 80 is joined to the center of the airbag main body 41 in the fore-and-aft direction with the vertical joint portions 82a (FIG. 12B).

Thus, the front end of the inflated upstream inflation portion 83 is located rearward, and the obstacle O in front of the airbag main body 41 is further prevented from being pushed hard by the upstream inflation portion 83.

(3) The communication portion 94 and the pressure regulator valve 95, which form the gas flow restrictor in the vertical partition 80, are opened when an external force is applied upon restraint of the occupant by the upstream inflation portion 83 (FIG. 8).

Thus, before the occupant is restrained with the upstream inflation portion 83, the communication portion 94 and the pressure regulator valve 95 are both substantially closed to restrict the inflating gas in the upstream inflation portion 83 from flowing into the downstream inflation portion 84 through the communication portion 94 and the pressure regulator valve 95. When the occupant is restrained with the upstream inflation portion 83, the external force applied upon the restraint causes the communication portion 94 and the pressure regulator valve 95 to be opened and thus removes the restriction. During restraint of the occupant with the upstream inflation portion 83 also, the communication portion 94 and the pressure regulator valve 95 narrow the passage area for the inflating gas and considerably restrict the inflating gas from flowing into the downstream inflation portion 84.

(4) The lateral partition 60, which has the auxiliary gas flow restrictor (the communication portion 66 and the check valve 67), is provided in the airbag main body 41 and below the vertical partition 80. The auxiliary inflation portion 72 is located below and adjacent to the upstream inflation portion 83 and receives the inflating gas that has passed through the upstream inflation portion 83 and the auxiliary gas flow restrictor (FIG. 6A).

The lateral partition 60 restricts the dimension of the upstream inflation portion 83 in the automobile widthwise direction when the upstream inflation portion 83 is inflated at the boundary between the lateral partition 60 and the vertical partition 80. Thus, using the lateral partition 60 having different dimensions in the automobile widthwise direction allows adjusting the dimension of the upstream inflation portion 83 in the automobile widthwise direction.

Second Embodiment

An automobile side airbag apparatus according to a second embodiment will now be described with reference to FIGS. 13 to 15.

Figure 13:
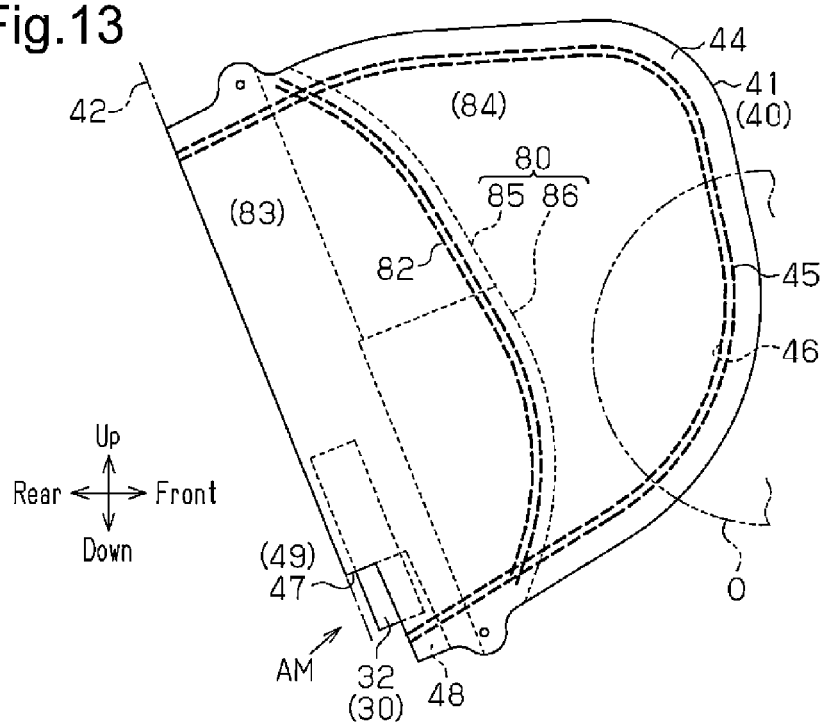
FIG. 13 is a side view illustrating, together with an obstacle, a side airbag apparatus according to a second embodiment of the present invention in which an airbag module is in a state where an airbag main body is in an uninflated and deployed state.

FIG. 13 shows the airbag module AM in which the airbag main body 41 is in an uninflated and deployed state. FIG. 15A shows, together with an occupant P, the airbag module AM in which the airbag 40 of FIG. 13 is cut at the center portion of the automobile widthwise direction to show the internal structure of the airbag module AM.

As shown in FIGS. 13 and 15A, the main body fabric portions 43, 44 of the airbag main body 41 have the shape and the size that can occupy the side of the thorax region PT of the occupant P when the airbag main body 41 is deployed and inflated between the automobile seat 12 and the body side portion 11. Thus, the dimension of the main body fabric portions 43, 44 in the vertical direction is shorter than that in the first embodiment.

Figure 14A:
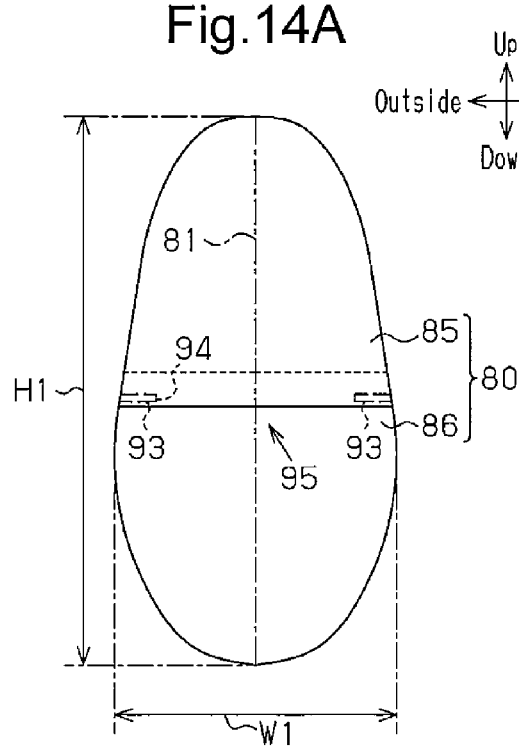
FIG. 14A is a front view illustrating the vertical partition according to the second embodiment.
Figure 14B:
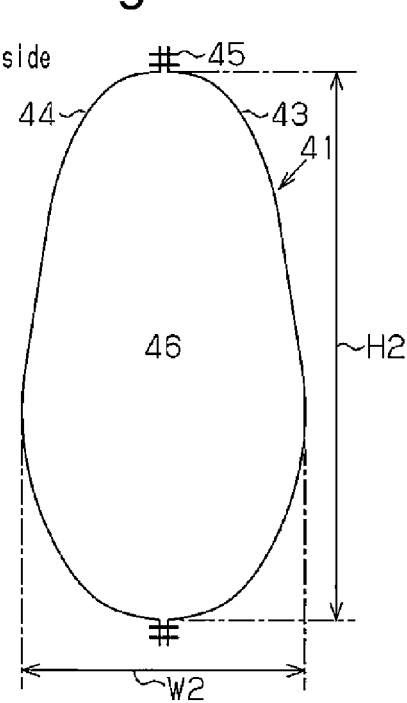
FIG. 14B is a cross-sectional front view illustrating the airbag main body assuming that the airbag main body is inflated without the vertical partition.

As shown in FIGS. 14A and 14B, the dimension W1 of the vertical partition 80 in the automobile widthwise direction is set to a dimension that is equal or approximate to the dimension W2 of the airbag main body 41 in the automobile widthwise direction in a case in which the airbag main body 41 without the vertical partition 80 is inflated.

The dimension of the vertical partition 80 in the deployed state in the vertical direction at a predetermined position in the automobile widthwise direction is referred to as H1. In a case in which the airbag main body 41 without the vertical partition 80 is inflated, the dimension of the airbag main body 41 in the vertical direction at the same position is referred to as H2. In the second embodiment, the dimension H1 of the vertical partition 80 is set to a dimension that is equal or approximate to the dimension H2 of the airbag main body 41.

As shown in FIGS. 14A and 15B, the vertical partition 80 includes, as the gas flow restrictor, the communication portion 94 and the pressure regulator valve 95 having the same structures as those in the first embodiment.

As shown in FIGS. 13 and 15A, the upper end and the lower end of the vertical partition 80, which is folded forward in half along the folding line 81, which extends in the vertical direction, are joined by sewing to the main body fabric portions 43, 44 via the peripheral joint portions 45. The vertical partition 80 is joined to the corresponding main body fabric portions 43, 44 with the vertical joint portions 82. The vertical joint portions 82 extend in the vertical direction along the peripheral portions on both ends of the vertical partition 80 in the automobile widthwise direction. The vertical partition 80 is installed to extend between the main body fabric portions 43, 44 by the above described joining operation.

Part of the inflation portion 46 rearward of the vertical partition 80 forms the upstream inflation portion 83, which is deployed and inflated beside the rear half of the thorax region PT of the occupant P. Part of the inflation portion 46 forward of the vertical partition 80 forms the downstream inflation portion 84, which is deployed and inflated beside the front half of the thorax region PT.

Unlike the first embodiment, the second embodiment has no lateral partition 60, which includes the auxiliary gas flow restrictor (the communication portion 66 and the check valve 67).

Other than these differences, the second embodiment is the same as the first embodiment. Thus, like or the same reference numerals are given to those components that are like or the same as the corresponding components described above in the first embodiment and detailed explanations are omitted.

As described above, although the second embodiment has no lateral partition 60, which includes the auxiliary gas flow restrictor, nor the auxiliary inflation portion 72 at the lower section of the airbag main body 41, the second embodiment is similar to the first embodiment in that the vertical partition 80, which includes the gas flow restrictor, divides the inside of the airbag main body 41 into the upstream inflation portion 83 and the downstream inflation portion 84.

Thus, when the inflating gas is supplied to the upstream inflation portion 83 in response to an impact from the side of the automobile seat 12, the upstream inflation portion 83 acts to deploy and inflate to have curved surfaces in the vicinity of the side of the occupant P. At this time, the vertical partition 80, which defines the front portion of the upstream inflation portion 83, has a curved surface bulging forward. The occupant P is restrained by the upstream inflation portion 83 and is protected from an impact.

When the upstream inflation portion 83 restrains the occupant, the inflating gas supplied to the upstream inflation portion 83 flows into the downstream inflation portion 84, which is located in front of the upstream inflation portion 83, through the gas flow restrictor (the communication portion 94 and the pressure regulator valve 95). The inflating gas causes the downstream inflation portion 84 to be deployed and to be inflated to have curved surfaces together with the upstream inflation portion 83. The vertical partition 80 is pulled toward the opposite sides in the automobile widthwise direction by the downstream inflation portion 84. The occupant P is restrained by the downstream inflation portion 84 in addition to the upstream inflation portion 83 and is protected from an impact.

The downstream inflation portion 84 starts to be deployed and inflated later than the upstream inflation portion 83. Thus, if any obstacle O is located ahead before the airbag main body 41 is inflated as shown by the long dashed double-short dashed line in FIG. 13, unlike the case in which the airbag main body 41 that is not divided by the vertical partition 80 is deployed and inflated at once, the obstacle O is unlikely to be pushed hard.

Since the vertical partition 80 is used, which has the dimension W1 in the automobile widthwise direction that is equal or approximate to the dimension W2 of the airbag main body 41 in the automobile widthwise direction, the vertical partition 80, when pulled by the downstream inflation portion 84, deforms from a curved surface that bulges forward to a flat surface that extends in the automobile widthwise direction. The airbag main body 41 inflates in the automobile widthwise direction to a dimension that is equal or approximate to the dimension in a case in which the airbag main body 41 without the vertical partition 80 is inflated. The dimension of the airbag main body 41 in the automobile widthwise direction when the airbag main body 41 is inflated is unlikely to be restricted by the vertical partition 80. Thus, the airbag main body 41 is inflated in the automobile widthwise direction to the maximum dimension available and favorably restrains and protects the occupant P.

Since the dimension of the airbag main body 41 in the automobile widthwise direction is unlikely to be restricted by the vertical partition 80 as described above, the front end of the inflated downstream inflation portion 84 is located rearward as compared to a case in which the dimension is restricted. Thus, if any obstacle O is located ahead before the airbag main body 41 is inflated, the obstacle O is unlikely to be pushed by the downstream inflation portion 84.

Since the vertical partition 80 is joined by the vertical joint portions 82 to the center of the airbag main body 41 in the fore-and-aft direction, the front end of the upstream inflation portion 83 is located rearward when the airbag main body 41 is inflated as compared to a case in which the vertical partition 80 is joined at a position forward of the center. As a result, the obstacle O in front of the airbag main body 41 is more unlikely to be pushed hard by the upstream inflation portion 83.

Since the vertical partition 80 is used, which has the dimension H1 in the vertical direction that is equal or approximate to the dimension H2 of the airbag main body 41 in the vertical direction, the vertical partition 80, when pulled by the downstream inflation portion 84, deforms from a curved surface that bulges forward to a shape closer to a flat surface that extends in the automobile widthwise direction. The airbag main body 41 is inflated in the automobile widthwise direction and in the vertical direction to the dimensions W1, H1 that are equal or approximate to the dimensions in the case in which the airbag main body 41 without the vertical partition 80 is inflated. The dimensions in the automobile widthwise direction and in the vertical direction when the airbag main body 41 is inflated is unlikely to be restricted by the vertical partition 80. The airbag main body 41 is inflated in the automobile widthwise direction and in the vertical direction to the maximum dimension available.

Thus, the second embodiment has the following advantage in addition to the above described advantages (1) to (3).

(5) The dimension H1 of the vertical partition 80 in the vertical direction is set to a dimension that is equal or approximate to the dimension H2 of the airbag main body 41 in the vertical direction in the case in which the airbag main body 41 without the vertical partition 80 is inflated (FIGS. 14A and 14B).

Thus, the dimensions of the airbag main body 41 in the automobile widthwise direction and in the vertical direction are inhibited from being restricted by the vertical partition 80. The airbag main body 41, which is inflated in the automobile widthwise direction and in the vertical direction to the maximum dimensions available, more favorably restrains and protects the occupant P.

The above described embodiment may be modified as follows.

<Regarding Inflation Portion 46>

Each of the above embodiments is configured such that substantially the entire airbag main body 41 is formed by the inflation portion 46. However, part of the airbag main body 41 may be configured to receive no inflating gas and thus not to be inflated.

In the first embodiment, instead of or in addition to the lateral partition 60, which includes the communication portion 66 and the check valve 67, a lateral partition that includes an auxiliary gas flow restrictor may be provided in the airbag main body 41 above the vertical partition 80. Thus, the auxiliary inflation portion, which receives the inflating gas that has passed through the upstream inflation portion 83 and the auxiliary gas flow restrictor, is provided adjacent to the upper side of the upstream inflation portion 83.

In this case, the inflating gas in the upstream inflation portion 83 flows into the upper auxiliary inflation portion through the auxiliary gas flow restrictor. The inflating gas deploys and inflates the upper auxiliary inflation portion. As the upper auxiliary inflation portion is inflated, the upper lateral partition is pulled in the automobile widthwise direction and is brought under a tension. Thus, the dimension of the upstream inflation portion 83 in the automobile widthwise direction is restricted at the boundary between the vertical partition 80 and the lateral partition located above the vertical partition 80. Thus, using the upper lateral partition with different dimensions in the automobile widthwise direction allows adjusting the dimension of the upstream inflation portion 83 in the widthwise direction at the boundary between the vertical partition 80 and the lateral partition located above the vertical partition 80.

Figure 16:
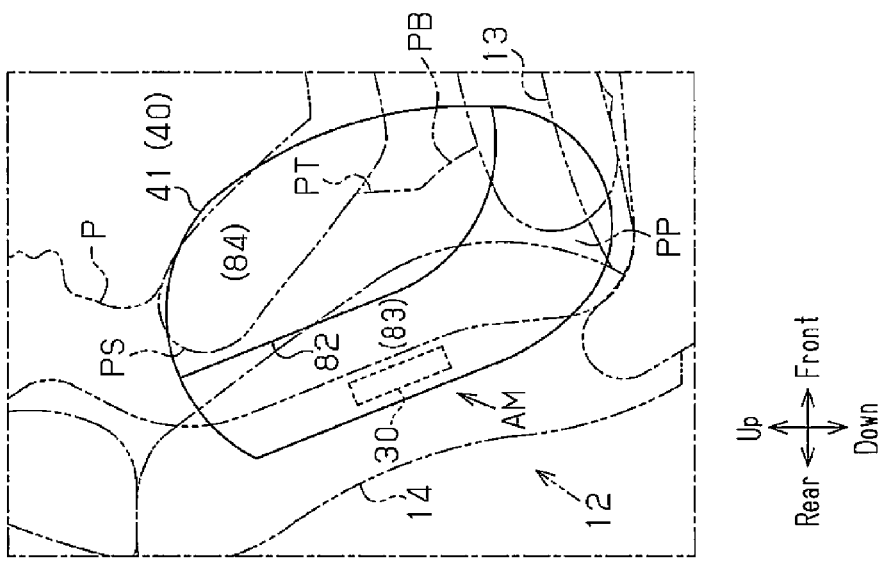
FIG. 16 is a partial side view illustrating an airbag main body according to a modification, together with an automobile seat and an occupant.

The shapes of the upstream inflation portion 83 and the downstream inflation portion 84 divided by the vertical partition 80 may be changed as shown in FIG. 16. The shapes are determined by the position of the joint between the vertical partition 80 and the airbag main body 41 joined with the vertical joint portions 82. In FIG. 16, at the lower section of the airbag main body 41, the vertical joint portions 82 are inclined so as to lower toward the front. In this case, the upstream inflation portion 83 is deployed and inflated beside the lumbar region PP in addition to the rear half of the thorax region PT of the occupant P. The downstream inflation portion 84 is deployed and inflated beside the front half of the thorax region PT.

In the second embodiment, the airbag main body 41 may be modified such that the lower part of the airbag main body 41 extends beyond the thorax region PT of the occupant P and is deployed and inflated beside the abdominal region PB, which is below the thorax region PT.

<Regarding Gas Flow Restrictor>

Figure 17:
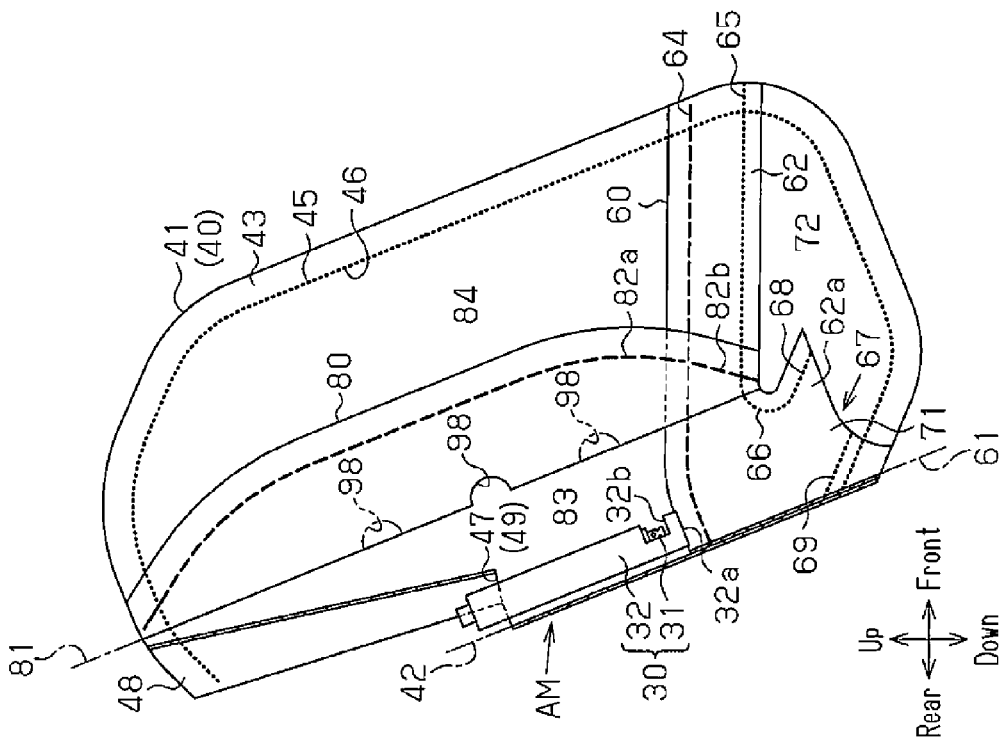
FIG. 17 is a cross-sectional side view illustrating the internal structure of an airbag module according to a modification of the present invention.

As shown in FIG. 17, instead of the communication portion 94 and the pressure regulator valve 95, an opening portion 98 may be provided on the vertical partition 80 as the gas flow restrictor. The opening portion 98 may include a bore that connects the upstream inflation portion 83 to the downstream inflation portion 84 and may permit the flow of the inflating gas from the upstream inflation portion 83 to the downstream inflation portion 84. In this case also, when the inflating gas in the upstream inflation portion 83 passes through the opening portion 98, the passage area is narrowed to restrict the flow of the inflating gas into the downstream inflation portion 84. The opening portion 98 may be provided at only one position on the vertical partition 80 as shown by the solid line in FIG. 17, or may be provided at many positions as shown by the long dashed double-short dashed lines.

The gas flow restrictor may be configured by the opening portion 98 and the combination of the communication portion 94 and the pressure regulator valve 95.

As the communication portion and the pressure regulator valve, a component may be employed that is controlled based on whether a condition is satisfied that the internal pressure of the upstream inflation portion 83 exceeds a predetermined value. Specifically, the component is substantially closed until the condition is satisfied and is opened when the condition is satisfied.

For example, instead of the communication portion 94, a bore that connects the upstream inflation portion 83 to the downstream inflation portion 84 is formed at a position in the vertical partition 80 of the first and second embodiments where the communication portion 94 is provided. The bore constitutes the communication portion.

Also, a lid sheet is arranged, as a pressure regulator valve, at a position in the upstream inflation portion 83 or the downstream inflation portion 84 to close the bore. The lid sheet is joined to the vertical partition 80 with the joint portion that surrounds the bore. The joint portion is formed by sewing with sewing threads or adhesion using an adhesive. At least part of the joint portion breaks when the internal pressure in the upstream inflation portion 83 exceeds a predetermined value.

In this case, when the internal pressure of the upstream inflation portion 83 is less than or equal to the predetermined value, the internal pressure is applied to the joint portion through the lid sheet, but the joint portion does not break and continues to join the lid sheet to the vertical partition 80 around the bore.

When the joint portion is formed by applying an adhesive to the vertical partition 80 continuously around the bore in an annular form, the bore is clogged by the lid sheet, that is, the bore and the lid sheet are closed.

In contrast, when the joint portion is formed by sewing, since the lid sheet is intermittently joined to the vertical partition 80 with threads, a small amount of inflating gas may leak from the seams. Thus, the bore and the lid sheet are substantially closed.

If the internal pressure exceeds the predetermined value, and a great force is applied to the joint portion via the lid sheet, at least part of the joint portion breaks. Due to the breakage, the lid sheet no longer closes the bore, that is, the bore and the lid sheet are opened. The inflating gas is allowed to pass through the bore and the lid sheet through the broken part.

<Regarding Lateral Partition 60>

In place of the tether extending between the main body fabric portions 43 and 44 of the airbag main body 41, the lateral partition 60 may be formed by a seam that is generated by bringing the main body fabric portions 43, 44 in contact with each other and sewing (joining) these together.

<Regarding Vertical Partition 80>

In each of the above embodiments, the peripheral portions of the vertical partition 80 in the automobile widthwise direction may be joined to the main body fabric portions 43, 44 in the upstream inflation portion 83 or in the downstream inflation portion 84.

One of the peripheral portions may be joined to the associated one of the main body fabric portions 43, 44 in the upstream inflation portion 83, and the other one of the peripheral portions may be joined to the associated one of the main body fabric portions 43, 44 in the downstream inflation portion 84.

Parts of the overlapping portions 91 that function as the valve bodies 96, 97 are parts corresponding to the communication portion 94 in the automobile widthwise direction. Therefore, as long as at least part (for example, the distal ends 96$t$, 97$t$) of the valve bodies 96, 97 are in contact with each other to be closed when the upstream inflation portion 83 is deployed and inflated, parts of the overlapping portions 91 that do not correspond to the communication portion 94 (parts not in the vicinity) may be modified. For example, parts of the overlapping portions 91 that do not correspond to the communication portion 94 (parts not in the vicinity) may be joined partially or entirely. The joining means may be sewing or adhering. According to this modification, only parts of the overlapping portions 91 that correspond to the communication portion 94 operate as the valve bodies 96, 97, and parts of the overlapping portions 91 that do not correspond to the communication portion 94 are prevented from unnecessarily moving, for example, flapping. Furthermore, a cutout may be formed at least at a part of the portion of the overlapping portions 91 that does not correspond to the communication portion 94.

The valve bodies 96, 97 may be formed by members different from the vertical partition 80, which includes the communication portion 94.

The communication portion 94 may be provided at positions on the side joint portions 93 separate from the folding line 81 in a direction perpendicular to the folding line 81. The communication portion 94 may be provided at multiple positions on the side joint portions 93. In these cases also, like the above embodiments, the valve bodies 96, 97 are provided around each communication portion 94.

The pair of overlapping portions 91, which includes the valve bodies 96, 97, may be arranged in the downstream inflation portion 84 instead of the upstream inflation portion 83 before the inflation portion 46 is deployed and inflated.

The vertical partition 80, which is folded in half, may be provided in the inflation portion 46 in the uninflated and deployed state with the folding line 81 located closer to the downstream inflation portion 84 than the vertical joint portions 82, 82$a$, 82$b$. In this case, the overlapping portions 91, which have the valve bodies 96, 97, may be located in the downstream inflation portion 84 before the inflation portion 46 is deployed and inflated.

The vertical partition 80 may be located rearward of the center of the airbag main body 41 in the fore-and-aft direction.

The more the vertical partition 80 is located rearward, the more the front end portion of the inflated upstream inflation portion 83 is located rearward. Thus, if any obstacle O is located ahead before the airbag main body 41 is inflated, the obstacle O is further prevented from being pushed hard by the inflated upstream inflation portion 83. However, the volume of the inflated upstream inflation portion 83 is reduced, which deteriorates the performance in restraining and protecting the occupant P.

Therefore, on condition that the vertical partition 80 is located at or rearward of the center portion, the position of the vertical partition 80 in the fore-and-aft direction is preferably determined in accordance with which of the function to inhibit pushing the obstacle O and the function to restrain and protect the occupant P carries more importance.

<Regarding Storage Portion 18 of Airbag Module AM>

Instead of the seat back 14 of the automobile seat 12, the storage portion 18 may be located in the body side portion 11 to accommodate the airbag module AM.

<Other Modifications>

The present invention may be applied to an automobile seat 12 that faces in a direction other than the forward direction, for example, in an automobile seat 12 that faces sideways. In this case, when an impact is applied to a side of the automobile seat 12 (in the front-rear direction of the car), the side airbag apparatus protects an occupant P from the impact.

Automobiles to which the side airbag apparatus according to the present invention is applied include various industrial vehicles in addition to private cars.

The side airbag apparatus can be applied to side airbag apparatuses that are mounted on vehicles other than automobiles, for example, airplanes, boats, and ships and protect an occupant seated in a vehicle seat from an impact.

The invention claimed is:

1. A side airbag apparatus comprising an airbag main body, which is deployed and inflated beside an occupant seated in a vehicle seat to restrain the occupant by inflating gas supplied in response to an impact applied from a side of the vehicle seat, wherein
the inside of the airbag main body is divided by a vertical partition including a gas flow restrictor at least into an upstream inflation portion, which is located rearward of the vertical partition and receives inflating gas, and a downstream inflation portion, which is located forward of the vertical partition and receives the inflating gas that has passed through the upstream inflation portion and the gas flow restrictor, and
the dimension of the vertical partition in a widthwise direction of the vehicle seat is set to a dimension that is equal or approximate to the dimension of the airbag main body in the widthwise direction in a case in which the airbag main body is inflated without the vertical partition.

2. The side airbag apparatus according to claim 1,
wherein the vertical partition is located at or rearward of a center portion of the airbag main body in a fore-and-aft direction.

3. The side airbag apparatus according to claim 1, wherein
the gas flow restrictor is formed by at least one of an opening portion and a combination of a communication portion and a pressure regulator valve,
one of the condition that an external force is applied upon restraint of the occupant by the upstream inflation portion and the condition that an internal pressure of the upstream inflation portion exceeds a predetermined value is used, and the communication portion and the pressure regulator valve are substantially closed until the condition is satisfied and are opened when the condition is satisfied, and
the opening portion includes a bore that connects the upstream inflation portion to the downstream inflation portion and permits the flow of inflating gas from the upstream inflation portion to the downstream inflation portion.

4. The side airbag apparatus according to claim 1, wherein the dimension of the vertical partition in a vertical direction is set to a dimension that is equal or approximate to the dimension of the airbag main body in the vertical direction in a case in which the airbag main body is inflated without the vertical partition.

5. The side airbag apparatus according to claim 1, further comprising a lateral partition that is located at one of a position above and a position below the vertical partition inside the airbag main body and includes an auxiliary gas flow restrictor, and an auxiliary inflation portion that is located adjacent to the upstream inflation portion and receives the inflating gas that has passed through the upstream inflation portion and the auxiliary gas flow restrictor.

* * * * *